United States Patent
Walker

(10) Patent No.: US 9,764,861 B2
(45) Date of Patent: Sep. 19, 2017

(54) SPACE CRAFT COMPRISING AT LEAST ONE PAIR OF SUPPORTING ARMS, SAID ARM PAIR BEING EQUIPPED WITH A HOLLOW MOUNTING MODULE, AND METHOD FOR EMPLOYING SUCH A CRAFT

(71) Applicant: Airbus Defence and Space SAS, Les Mureaux (FR)

(72) Inventor: Andrew Nicholas Walker, Pechbusque (FR)

(73) Assignee: Airbus Defence and Space SAS, Les Mureaux (FR)

(*) Notice: Subject to any disclaimer, the term of this patent is extended or adjusted under 35 U.S.C. 154(b) by 104 days.

(21) Appl. No.: 14/895,823

(22) PCT Filed: May 20, 2014

(86) PCT No.: PCT/FR2014/051168
§ 371 (c)(1),
(2) Date: Dec. 3, 2015

(87) PCT Pub. No.: WO2014/195596
PCT Pub. Date: Dec. 11, 2014

(65) Prior Publication Data
US 2016/0114909 A1 Apr. 28, 2016

(30) Foreign Application Priority Data
Jun. 3, 2013 (FR) ...................................... 13 01251

(51) Int. Cl.
*B64G 1/44* (2006.01)
*B64G 1/22* (2006.01)
(Continued)

(52) U.S. Cl.
CPC ............ *B64G 1/443* (2013.01); *B64G 1/007* (2013.01); *B64G 1/222* (2013.01); *B64G 1/24* (2013.01);
(Continued)

(58) Field of Classification Search
CPC .......... B64G 1/007; B64G 1/222; B64G 1/24; B64G 1/405; B64G 1/44; B64G 1/503;
(Continued)

(56) References Cited

U.S. PATENT DOCUMENTS 3,817,477 A * 6/1974 Luther ................... B64G 1/222
                                                136/245
5,833,175 A * 11/1998 Caplin ..................... B64G 1/10
                                                244/158.1
(Continued)

FOREIGN PATENT DOCUMENTS

GB       2 319 360 A    5/1998
WO   WO 2010/096118 A1  8/2010

OTHER PUBLICATIONS

International Search Report and Written Opinion PCT/FR2014/051168, mailed Sep. 2, 2014, 10 pages.
(Continued)

*Primary Examiner* — Justin Benedik
(74) *Attorney, Agent, or Firm* — Patterson Thuente Pedersen, P.A.

(57) ABSTRACT

Space craft comprising a body, at least one pair of supporting arms, a first device mounted on a first supporting arm and a second device mounted on a second supporting arm. The first arm is rotatably mounted on the body of the craft about an axis of rotation. The second arm is fixed to the body, and in which craft of the first device and the second device at least one is offset from the axis of rotation of the first arm. The pair of supporting arms further comprises a
(Continued)

hollow module for the rotatable mounting of the first arm on the body. The mounting module comprising an opening through which the axis of rotation and the second supporting arm pass.

15 Claims, 25 Drawing Sheets

(51) Int. Cl.
*B64G 1/24* (2006.01)
*B64G 1/40* (2006.01)
*B64G 1/50* (2006.01)
*B64G 1/00* (2006.01)
*B64G 1/58* (2006.01)
*B64G 1/66* (2006.01)

(52) U.S. Cl.
CPC .............. *B64G 1/405* (2013.01); *B64G 1/44* (2013.01); *B64G 1/503* (2013.01); *B64G 1/58* (2013.01); *B64G 1/506* (2013.01); *B64G 1/66* (2013.01)

(58) Field of Classification Search
CPC . B64G 1/58; B64G 1/506; B64G 1/66; B64G 1/443; B64G 1/645
See application file for complete search history.

(56) References Cited

U.S. PATENT DOCUMENTS

| | | | | | |
|---|---|---|---|---|---|
| 6,102,339 | A | * | 8/2000 | Wu | B64G 1/503 244/171.8 |
| 6,378,809 | B1 | * | 4/2002 | Pon | B64G 1/503 244/171.8 |
| 6,669,147 | B2 | * | 12/2003 | Bertheux | B64G 1/503 244/172.6 |
| 7,036,772 | B2 | * | 5/2006 | Walker | B64G 1/222 244/171.8 |
| 2002/0112417 | A1 | * | 8/2002 | Brown | B64G 1/222 52/108 |

OTHER PUBLICATIONS

English translation of International Search Report for PCT/FR2014/051168, mailed Sep. 2, 2014, 3 pages.
English translation of Written Opinion for PCT/FR2014/051168, mailed Sep. 2, 2014, 5 pages.
B. Heizer, S. Goo, G. Rhodes, D. Thoreson, and R. Parish, "*A steerable radiator for spacecraft application*", 4th Thermophysics and Heat Transfer Conference, Fluid Dynamics and Co-located Conferences, AIAA Paper 86-1298, 3 pages.

* cited by examiner

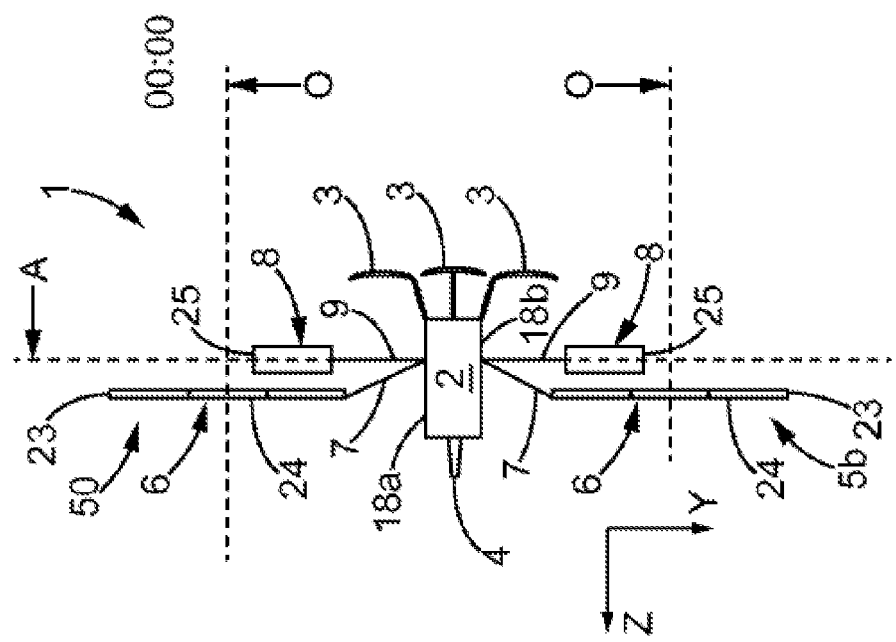
FIG. 5
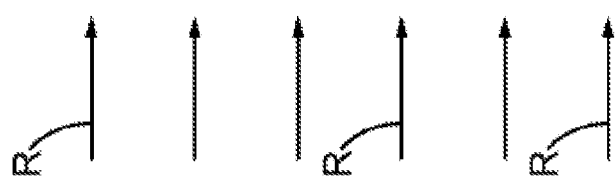
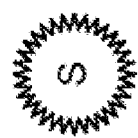

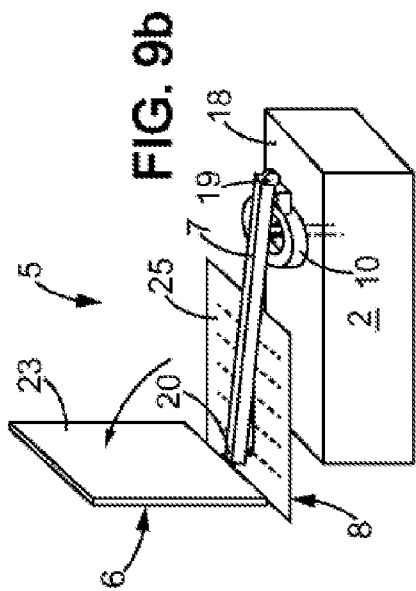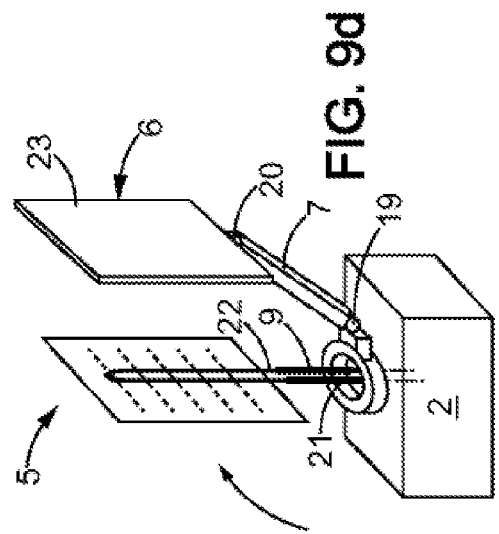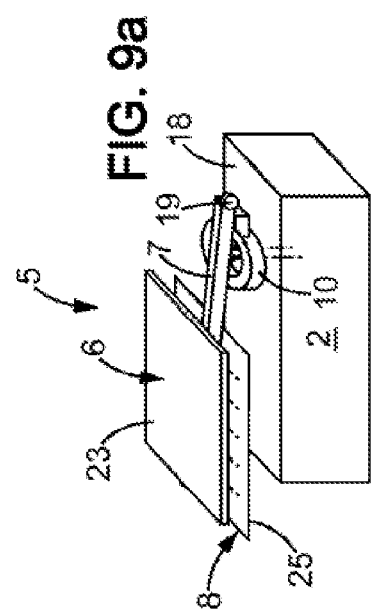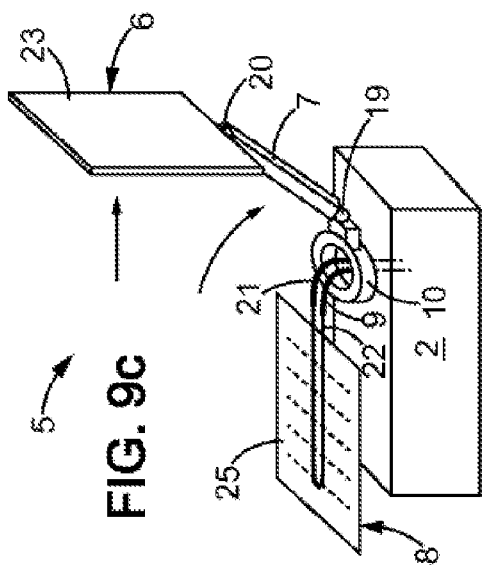

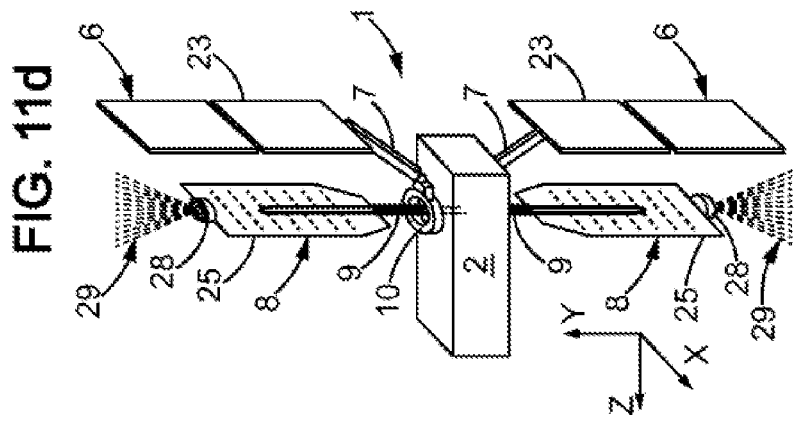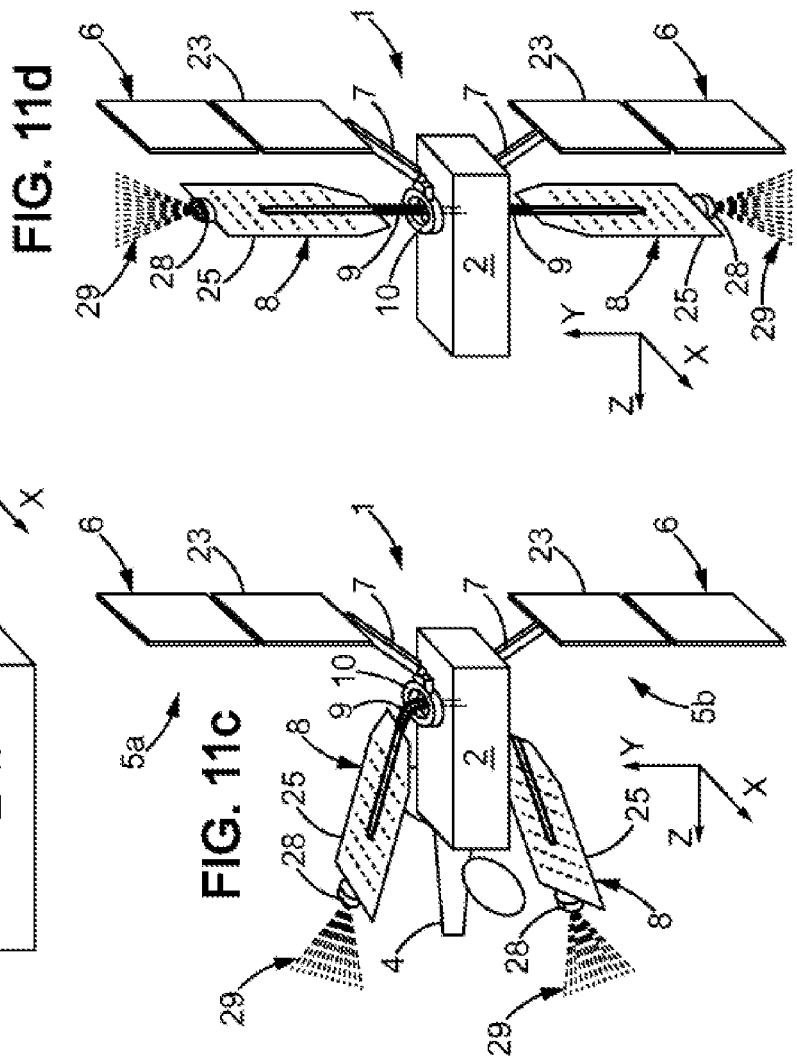

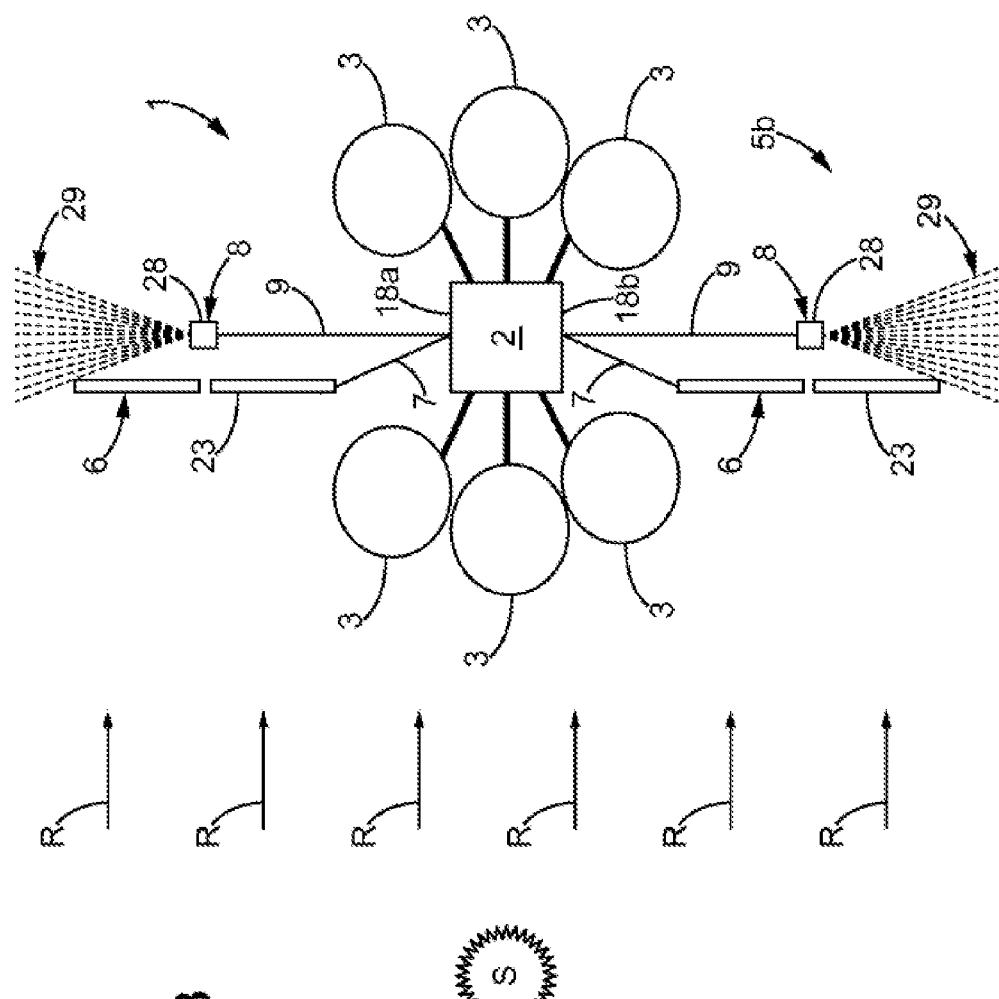
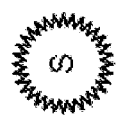
FIG. 13

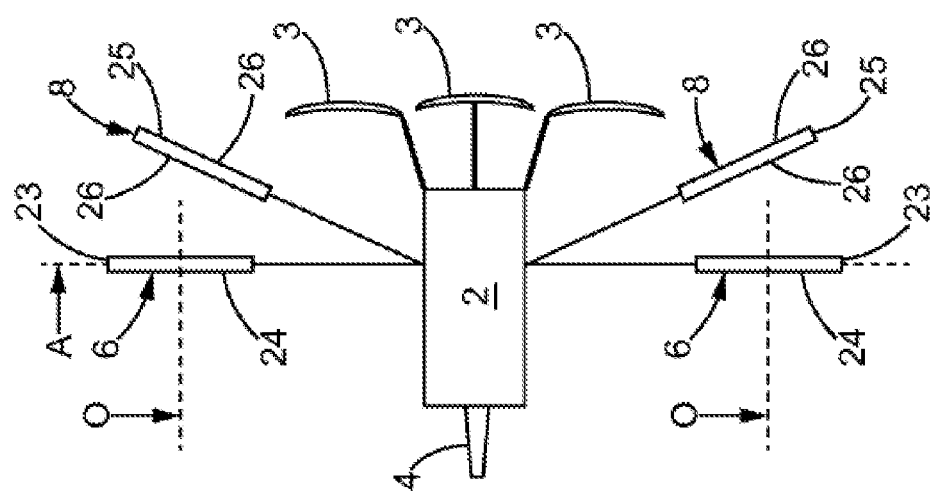
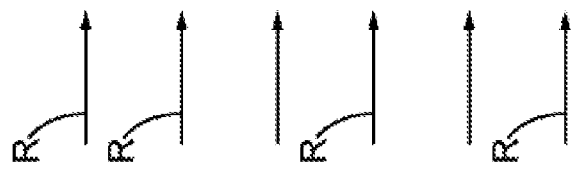
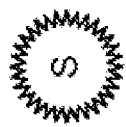
FIG. 19

SPACE CRAFT COMPRISING AT LEAST ONE PAIR OF SUPPORTING ARMS, SAID ARM PAIR BEING EQUIPPED WITH A HOLLOW MOUNTING MODULE, AND METHOD FOR EMPLOYING SUCH A CRAFT

RELATED APPLICATIONS

The present application is a National Phase entry of PCT Application No. PCT/FR2014/051168, filed May 20, 2014, which claims priority from FR Patent Application No. 13 01251, filed Jun. 3, 2013, said applications being hereby incorporated by reference herein in their entirety.

FIELD OF THE INVENTION

The present invention relates to space craft such as satellites and, more specifically, space craft intended to support a plurality of items of equipment and to remain in orbit around a planet.

BACKGROUND OF THE INVENTION

A satellite, more specifically, a geostationary telecommunications satellite, is typically in the form of a rectangular parallelepiped, on which are defined a north face and a south face, an east face and a west face, a front face and a rear face. The north, south, east and west faces are thus named corresponding to the cardinal points of the planet around which the satellite is placed. The front face is the one directed towards the planet, the rear face is the opposite face.

The satellite comprises a plurality of items of equipment mounted on its different faces, such as antennas, radiators or also motor nozzles. As a result, the spatial requirement is a major challenge in the design of satellites and their equipment, the total external surface area limiting the number and dimensions of the equipment that can be installed.

More specifically, each item of equipment is subjected to its own particular constraints. For example, an antenna must not have a field of view that is obscured by the other equipment. Motors, such as plasma thrusters, generate a plasma jet which risks damaging neighbouring equipment. A solar panel must be exposed to the sun over the greatest possible surface area.

Thus, positions and minimum distances between the equipment must be respected in order to guarantee their correct operation, so that the surface area on the outside of the satellite is rapidly overloaded.

The problem will be explained more specifically using the example of radiators for geostationary satellites, i.e. satellites which are fixed relative to a point on a planet.

A satellite can comprise numerous items of equipment which generate temperature increases during their operation, and which therefore require cooling. Furthermore, the satellite in space receives solar radiation, which increases the temperature of the equipment. These temperature increases can damage the equipment, which therefore has to be cooled. To this end, provision can be made to thermally link thermally radiative surfaces, more commonly called radiators, to the equipment, which radiators have the function of removing heat to cold space.

The radiators are positioned on the external surface of the satellite so as not to be subjected to temperature increase, i.e. they are, so far as possible, shielded from the solar radiation. To this end, a radiator is generally mounted on the north face or the south face of the satellite, so that the radiative surface of the radiator, turned towards space, is positioned on the north face or the south face. In fact, the north and south faces of the satellite are the least exposed to the solar radiation, so that the radiative face of the radiator receives little or no solar radiation.

The document U.S. Pat. No. 6,102,339 (WU et al.) illustrates an example of a satellite in which the north and south faces are each covered by a radiator.

However, the size of the radiators is limited by the dimension of the north and south faces. Now, the larger the radiative surface area, the more efficient the dissipation of heat. The dimensions of the north and south faces of the satellite are limited in particular by the fact that, in order to be able to be put into orbit, the satellite is placed in a launch vehicle beforehand. The satellite must then be as compact as possible.

Thus, it is known to install deployable radiators which are folded during the launch of the satellite and deployed when the satellite is in orbit. The documents FR 2 823 182 (ALCATEL), U.S. Pat. No. 5,833,175 (CAPLIN) and WO 03/059740 (ASTRIUM) each present an example of such radiators. The deployed radiative surface area is however limited by the other equipment of the satellite, such as the antennas which, as has already been said, must not be obstructed when the radiators are deployed. Furthermore, such radiators are not completely shielded from the solar rays. In fact, while the satellite generally remains in the plane of the planet's equator, the angle of the incident solar rays can have a variable inclination depending on the position of the planet in relation to the sun. As a result, solar rays can reach the north and south faces of the satellite, and therefore the radiators, reducing their efficiency.

Mirrors reflecting the sun's rays, known as Optical Solar Reflectors (OSR), can be used to cover the radiators, in order to further reduce the temperature increase due to the sun's rays. However, such mirrors increase the manufacturing costs of the satellite. Furthermore, they degrade over time, not ensuring efficient protection throughout the operation of the satellite.

The abovementioned document U.S. Pat. No. 6,102,339 (WU et al.) proposes to install a blocking device, mounted on a rotating solar panel on the satellite in order to follow the solar rays. The blocking device is then interposed between the radiators and the solar rays, the inclination of which with respect to the north and south faces of the satellite allows them to reach the radiators.

However, such an additional blocking device increases the overall spatial requirement on the body of the satellite in an undesirable manner. The manufacturing costs are also increased. Furthermore, such a blocking device must be folded at launch, then deployed once the satellite is in orbit. The kinematics of the deployment of the blocking device, combined with that to be developed for the solar panels and optionally the radiators, makes the design of the satellite more complex.

A need therefore exists for a novel satellite, in which the overall spatial requirement is reduced so that the items of equipment do not impede one another, without however making the design more complex.

SUMMARY OF THE INVENTION

A first subject of the invention is to propose a space craft in which the overall spatial requirement is reduced.

A second subject of the invention is to propose a space craft the manufacturing costs of which are not increased.

A third subject of the invention is to propose a space craft making it possible to advantageously create a zone shielded from the solar rays.

A fourth subject of the invention is to propose a space craft the deployment kinematics of which is simple.

The invention then proposes, according to a first aspect, a space craft comprising a body, at least one pair of arms called supporting arms, a first device mounted on a first supporting arm and a second device mounted on a second supporting arm. The first arm is rotatably mounted on the body of the craft, about an axis of rotation. The second arm is fixed to the body. Moreover, at least one of the first device and second device is offset with respect to the axis of rotation of the first arm. The pair of supporting arms further comprises a hollow module for the rotatable mounting of the first arm on the body, the mounting module comprising an opening through which the axis of rotation and the second supporting arm pass.

Thus, the spatial requirement on the body of the satellite is greatly reduced, since two devices are mounted using only a surface area corresponding to the surface area occupied by the mounting module. Moreover, as the devices are mounted on arms, and therefore at a distance from the body of the craft, there is little or no interaction between the two devices and the craft's other equipment.

According to a particular embodiment, the craft is a geostationary satellite, put into orbit around a planet, and comprises means for controlling a sun-synchronous rotation of the first arm about the axis of rotation. The first device is thus capable of being interposed between the sun and the second device throughout the orbit of the craft, so that the second device is at least partially in the shadow of the first device.

In fact, as the craft is a geostationary satellite, its position in relation to a point on the planet around which it is in orbit is identical throughout the orbit. However, as the planet revolves around the sun, the position of the satellite in relation to the sun changes during its orbit in the course of one day of the planet, so that certain parts of the satellite are reached by the sun's rays at certain times of the day whilst others are in shadow, and vice versa at other times. Now, by means of the mounting module and by controlling a sun-synchronous rotation of the first arm, the first device can follow the sun's rays throughout the orbit of the satellite. Thus, by interposing the first device between the second device and the sun, the second device can be in the shadow of the first device, i.e. the sun's rays cannot reach it.

According to an example, the first device comprises a solar panel with a front face capable of receiving the sun's rays, facing away from the second device and which is provided with solar cells, the annular mounting module then comprising means for establishing an electrical connection with the body.

Thus, the front face of the solar panel can advantageously follow the sun throughout the movement of the craft following its orbit around the planet, in order to benefit from maximum sunlight.

For example, the first device can comprise, in addition to or instead of the solar panel, a panel blocking the sun's rays, the blocking panel being coated with a layer of a material blocking the sun's rays, ensuring that the second device is not reached by rays from the sun.

According to an example, the second device comprises a radiator, the second arm being equipped with means for establishing a heat transfer between the radiator and equipment of the craft.

The radiator must advantageously be maintained at as low a temperature as possible in order to ensure good heat removal. It is therefore particularly advantageous to block the sun's rays capable of reaching it by means of the first device, all the more so when the first device is a solar panel for which maximum sunlight is sought.

The means for establishing a heat transfer between the radiator and the body comprise for example a fluid connection for the circulation of a coolant fluid.

Thus, the fluid connection can pass through the opening of the mounting module, reducing the spatial requirement on the body of the craft.

Preferably, the radiator is in the form of a panel with two opposite radiative faces and comprises a plurality of heat pipes distributed over the radiative faces. The heat pipes ensure a good distribution of the heat over all of the radiative faces, promoting heat removal. In particular, the radiator has two sides alternately closer to the first device, which can be hot, in particular when it is a solar panel. A thermal gradient can then appear between the hotter side, closer to the first device, and the second more distant side, which is unfavourable to heat removal. The heat pipes are therefore distributed from one side to the other of the radiative faces, avoiding the occurrence of this thermal gradient.

As a variant, the second device can comprise an antenna, in addition to or instead of the radiator. The first device is then transparent to waves the wavelength of which corresponds to one of the emission and/or reception wavelengths of the antenna.

The antenna can thus be at a distance from the other equipment on the craft, capable of obscuring its emission and/or reception field, and furthermore be kept shielded from the sun's rays which could damage it.

As a further variant, the second device can comprise, in addition to or instead of the radiator and/or the antenna, a nozzle for a motor for example of the plasma type.

There too, the nozzle can remain shielded from the sun's rays which risk undesirably increasing its temperature. Moreover, particularly advantageously, the nozzle is then at a distance from the other equipment, its jet, for example of plasma, can then be directed towards space without the risk of any equipment being reached by the jet.

According to an embodiment, the second arm comprises at least one portion flexible about any direction perpendicular to the axis of rotation of the first arm, the first device being aligned on the axis of rotation.

Thus, the position of the second device can be modified due to the flexibility of the second arm during the rotation of the first device so as to maintain a relative position between the first device and the second device in which the first device is interposed between the second device and the sun.

According to another embodiment, the second arm is rigid, the second device being aligned on the axis of rotation.

Thus, the position of the second device remains fixed whilst the first device rotates about the axis of rotation in order to maintain a relative position between the first device and the second device in which the first device is interposed between the second device and the sun.

According to an embodiment, the body has at least one face called a support face, and in which the first arm and the second arm are rotatably articulated with respect to the body about an axis of articulation perpendicular to the axis of rotation of the first arm. Each arm can then assume two extreme positions with respect to the support face:

a deployed position, in which the arm considered projects from said support face, a stowed position, in which the arm considered is brought substantially parallel to the support face.

Thus, the arms can advantageously be put into the stowed position when for example the craft is a satellite which must therefore be placed in a launch vehicle before being launched into orbit, in order to reduce the spatial requirement of the satellite and facilitate its installation in the launch vehicle. Then, once the satellite is launched, the arms can be brought into the deployed position.

For example, when the two arms are in the stowed position, they are superimposed one on the other, in a particularly compact manner.

According to a particularly advantageous embodiment, the second arm can assume an intermediate position in which it forms a predetermined angle with the support face. It is then particularly advantageous that the second device comprises a nozzle of a motor.

Preferably, the craft comprises two pairs of supporting arms, the first arms of each of the pairs being rotatably mounted on the body about the same axis of rotation. A first pair is for example mounted on a first support face and the second pair is mounted on a second support face of the body. The first support face and the second support face are opposite to one another along the axis of rotation of the first arm.

According to a second aspect, the invention proposes a method for the utilization of a craft around a planet as presented above with means for controlling a sun-synchronous rotation of the first arm, comprising the following operations:

putting the craft into geostationary orbit around the planet;

putting the first device into an initial position in relation to the second device in which the first device receives the sun's rays, the second device being at least partially in the shadow of the first device;

utilizing the means for controlling a sun-synchronous rotation of the first arm, the second device remaining in the shadow of the first device throughout the orbit around the planet.

Other features and advantages of the invention will become apparent in the light of the description given below, with reference to the attached figures showing various embodiments of the invention, and in which:

BRIEF DESCRIPTION OF THE DRAWINGS

FIG. 5 is a side view of the satellite in the position at a point in time marked 00:00 around the planet in FIG. 3, FIGS. 9a to 9d are perspective diagrammatic representations of four successive positions of the pair in FIG. 1, the supporting arms being articulated on the body, FIGS. 11a to 11d are representations similar to those in FIGS. 9a to 9d, of the satellite in FIG. 10 in which the supporting arms are articulated on the body of the craft, FIG. 13 is a side view of the satellite similar to that in FIG. 6, according to an embodiment variant, FIG. 19 is a side view of the satellite in FIGS. 16 and 17, in the position at a point in time marked 0:00 around the planet.

DETAILED DESCRIPTION OF THE DRAWINGS

Figure 1:
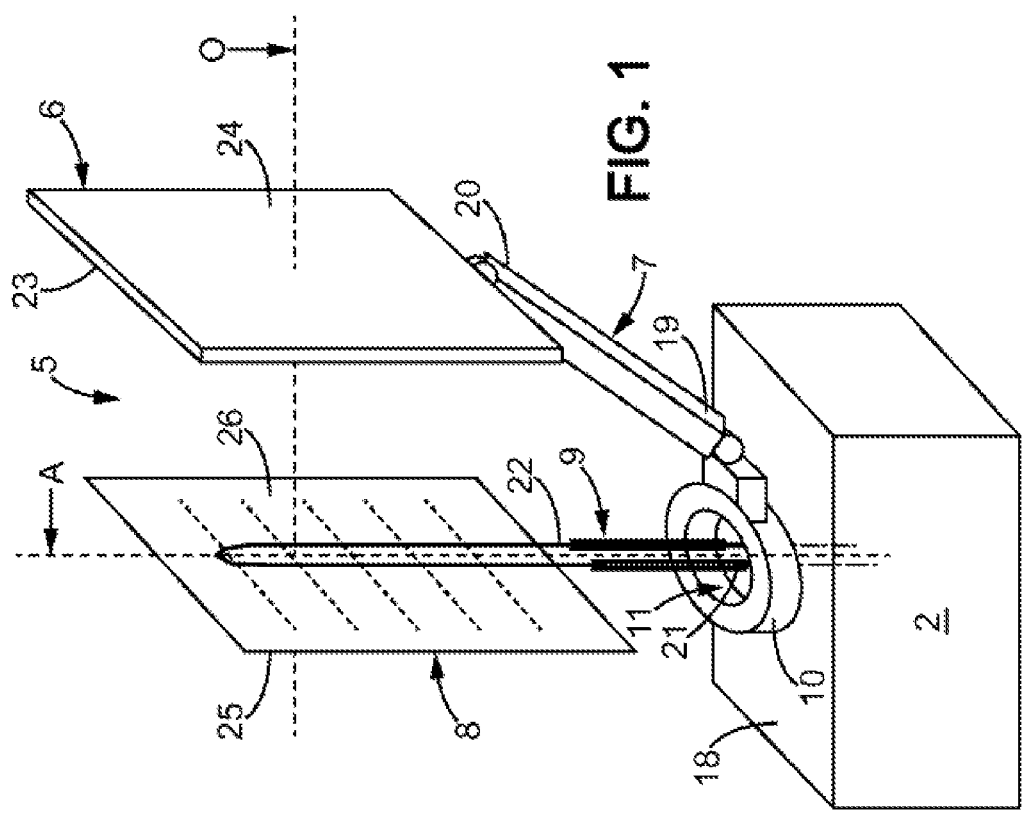
FIG. 1 is a diagrammatic perspective representation of a pair of supporting arms mounted on a support surface of a body of a space craft according to a first embodiment of the invention, by means of a mounting module.
Figure 15:
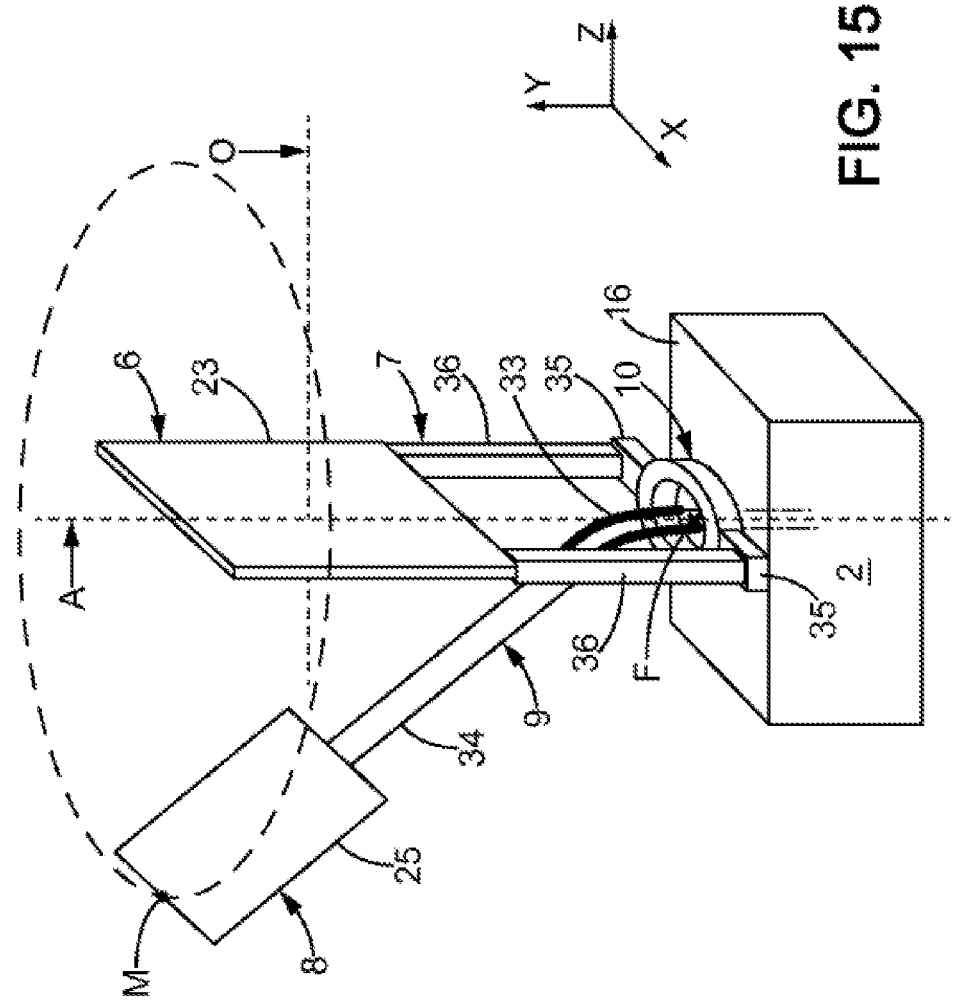
FIG. 15 is a representation similar to that in FIG. 1, according to a second embodiment of the invention.

FIGS. 1 and 15 show diagrammatically a portion of a body 2 of a space craft 1, such as a satellite, capable of being put into orbit around a planet P, such as a planet of our solar system.

The body 2 of a satellite 1 is conventionally in the form of a rectangular parallelepiped. Three axes Z, Y and X associated with the satellite 1 are intended to be oriented towards the planet P around which the satellite is placed in orbit, in a north-south direction, and in an east-west direction respectively. The body 2 of the satellite 1 has a north face, a south face, a face oriented towards the planet P, called front face, a face oriented away from the planet P, called rear face, and two lateral faces called east face and west face. The satellite 1 can also comprise antennas 3 fixed onto the rear face of the body 2 of the satellite 1, but at a distance in order to free their emission or reception lobe, and which are permanently oriented along the axis Z, towards the planet P or away from it. An omnidirectional antenna 4 can also be mounted on the front face of the body 2 of the satellite 1, in the direction of the planet.

The craft 1 also comprises at least one pair 5 of arms, called supporting arms as each supports at least one device. More specifically, a first device 6 is mounted on a first supporting arm 7 and a second device 8 is mounted on the second supporting arm 9 of the pair 5. The first arm 7 is rotatably mounted on the body 2 of the craft 1 about an axis denoted A. The second arm 9 is fixed to the body 2, i.e. at least one point of the second arm 9 is fixed with respect to the body 2 of the craft 1. There may for example be a single point for fixing the second arm 9 to the body 2 of the craft.

The word "arm" here takes on a broad meaning, and is in no way limitative as regards the shape or as regards the number of parts composing an arm nor as regards the rigidity. Thus, as will be seen below, an "arm" can be a rigid single part, or comprise several successive sections, articulated with respect to each other, or also comprise two parallel branches side by side. An arm can also be rigid, i.e. it does not deform during normal operating conditions, or be flexible.

By "device", is meant here both a single item of equipment, for example a solar panel, a radiator or a nozzle, and a set of equipment.

Preferably, the two devices 6, 8 are not aligned in a direction parallel to the axis of rotation A. For example, the first device 6 can be located on the axis of rotation A, whilst the second device 8 is offset with respect to the axis of rotation A. Conversely, the first device 6 can be offset with respect to the axis of rotation A, whilst the second device 8 is located on the axis of rotation A.

The two arms 7,9 of the pair project from the same face of the satellite 1, i.e. they each extend in a direction comprising at least one component perpendicular to the same face of the satellite 1.

The pair 5 of supporting arms also comprises a hollow module 10 for rotatably mounting the first arm 7 on the body 2 of the craft. The mounting module 10 comprises an opening 11, through which the axis of rotation A and the second supporting arm 9 pass.

Figure 2A:
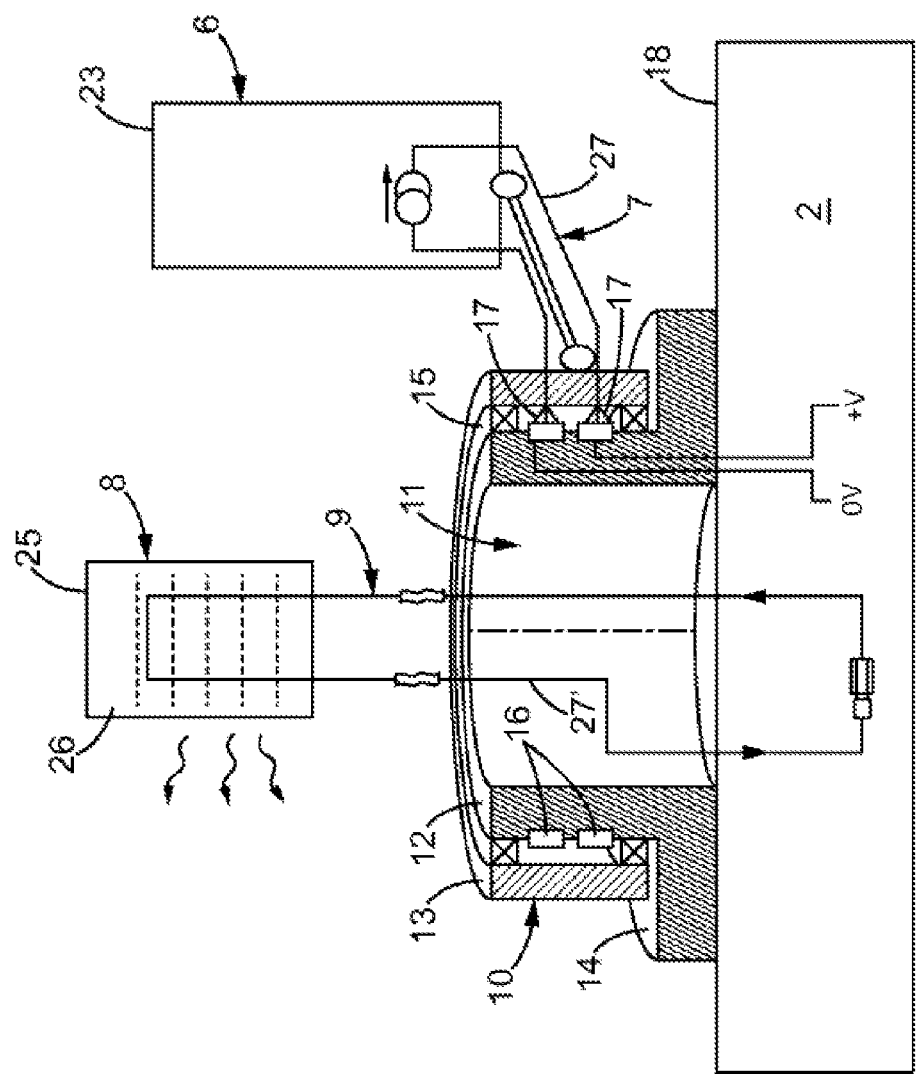
FIG. 2a is a cross-sectional view of an example of the mounting module of the embodiment in FIG. 1.
Figure 2B:
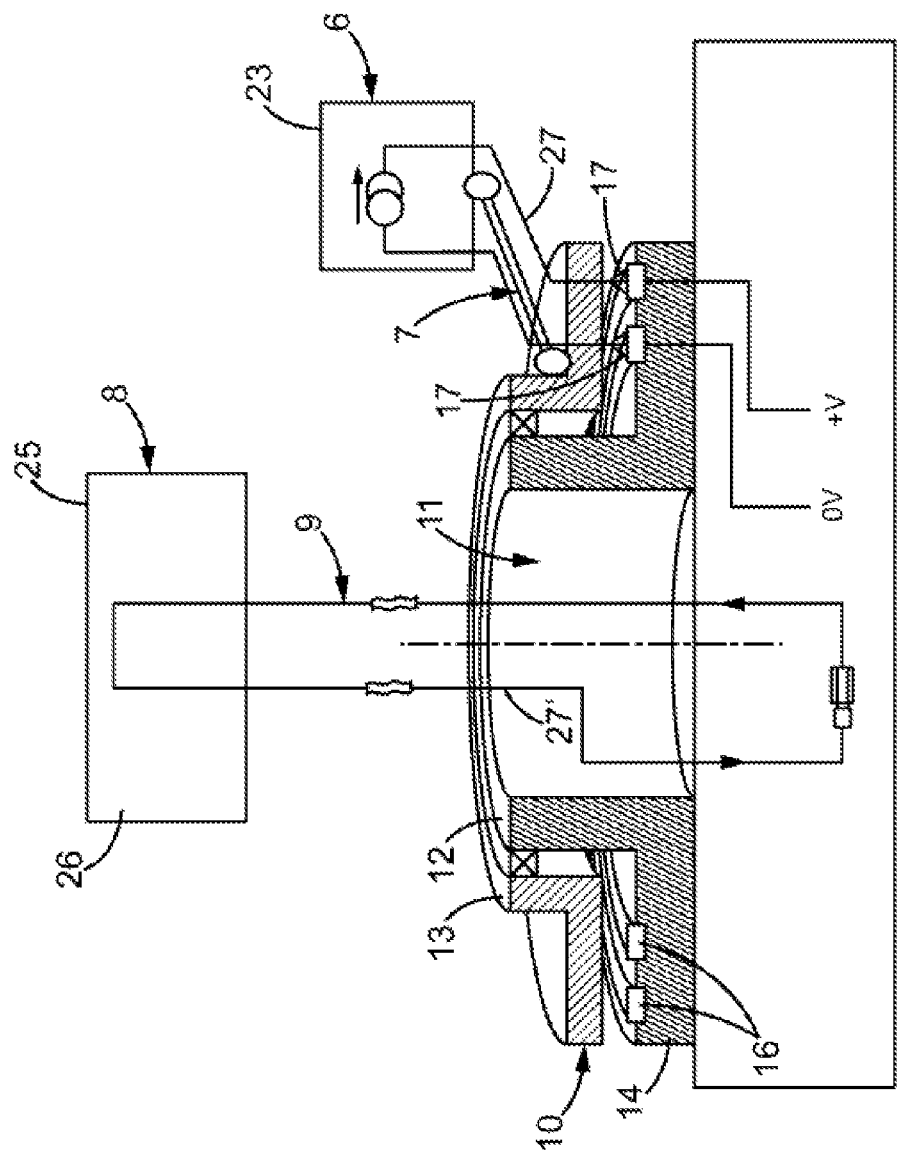
FIG. 2b is a cross-sectional view of a second example of the mounting module of the embodiment in FIG. 1.

The mounting module 10 can be for example in the form of a part rotationally symmetrical about an axis merged with the axis of rotation A, such as a cylinder, or ring, as shown in particular in FIG. 2a, or also in a flattened form, as shown in particular in FIG. 2b. The opening 11 is then substantially central in the module 10.

More specifically, the module 10 comprises two parts 12, 13, which are substantially annular. A first part 12, known as fixed, has for example a collar 14 allowing fixing to the body 2. The fixing means utilized between the body 2 and the collar 14 can be of any type, screwing being preferred. The fixed part 12 of the module 10 defines the opening 11 of the module 10. A second part 13, known as rotary, has an internal diameter greater than the external diameter of the fixed part 12, so that the rotary part 13 can be mounted on the fixed part 12.

The module 10 comprises means for allowing the rotation of the rotary part 13 with respect to the fixed part 12. For example, bearings 15 of the ball bearing type are interposed between the two parts 12, 13, so as to reduce the friction between the two parts 12, 13.

As will be explained below, it may be necessary to establish an electrical connection between the first device 6 and the body 2. To this end, rotary electrical connection means can also be interposed between the two parts 12, 13.

For example, the fixed part 12 is provided with annular, for example metallic, conductive rings 16 known as "slip rings", and electrically connected to the body 2. In a complementary manner, the rotary part 13 comprises brushes 17, each brush 17 being in contact with a conductive ring 16. Each brush 17 is also electrically connected to the first device 6.

For example, and as shown in particular in FIG. 2a, the conductive rings 16 are supported on a cylindrical external surface of the fixed part 12 and, in complementary manner, the brushes 17 are mounted on a cylindrical internal surface of the rotary part 13, facing the cylindrical external surface of the fixed part 12. The mounting module 10 is then in the form of a ring. As a variant, shown in particular in FIG. 2b, the conductive rings 16 are supported on an upper surface of the collar 14 of the fixed part 12. The rotary part 13 also comprises a collar. The brushes 17 are then supported on a lower surface of the collar of the rotary part 13, facing the upper surface of the collar 14 of the fixed part 12. In this variant, the mounting module 10 has a flattened form, which is more compact in the direction of the axis of rotation A than when the mounting module 10 is in the form of a ring.

The mounting module 10 is mounted on a face 18, called a support face, of the body 2 of the satellite 1. Advantageously, the support face 18 is merged with the north face or the south face of the satellite 1, or it is formed in the north face or the south face. It is in any case preferably parallel to the north and south faces. Preferably, the satellite comprises two support faces 18a, 18b, merged with or formed in the north face and the south face of the satellite respectively. The satellite then comprises two pairs of supporting arms, 5a, 5b respectively, mounted on the support faces, 18a, 18b respectively. For example, the first arm 6 of each pair 5a, 5b is rotatably mounted about the same axis of rotation A. Thus, in other words, the two pairs 5a, 5b are symmetrical with respect to one other about a median plane ZX of the satellite 1.

For each pair 5a, 5b respectively, provision can be made for the arms 7, 9 to be mounted projecting from a support face 18a, 18b respectively at least when the satellite 1 is placed in orbit and is in operation.

Thus, by occupying on a face, in this case a north face or a south face, of the satellite 1, only a surface area defined by the dimensions of the mounting module 10, it is possible to mount two arms 7, 9 each supporting a device 6, 8. The spatial requirement produced on the body 2 of the satellite 1 by the two devices 6, 8 is therefore reduced. In particular, the antennas 3, 4 placed on the front and rear faces of the body 2 are not impeded by the devices 6, 8 mounted on the supporting arms 7, 9. Moreover, as the arms 7, 9 project from the support face 18, the devices 6, 8 can be mounted at a distance from the body 2 of the satellite, and other equipment can be installed in the region of the space comprised between the support face 18 and the devices 6, 8. There too, the spatial requirement is therefore also reduced. More particularly, by choosing suitable lengths of arms 7, 9, the field of view of the antennas 3, 4 of the satellite 1 is not obscured by the first and second devices 6, 8.

According to a preferred embodiment, the satellite 1 is geostationary for a planet P, for example the Earth, and the first device 6 in particular has the role of following the rays R of the sun S during the operation of the satellite 1. To this end, the craft 1 is equipped with means for controlling a sun-synchronous rotation of the first arm 7 about the axis of rotation A.

By sun-synchronous is meant here the property according to which the rotation of the first arm 7 follows the sun despite the rotation of the satellite 1 around the Earth. More specifically, as the satellite 1 is geostationary, it always has the same face, in this case the front face, directed towards the Earth, and therefore it alternately has its front, rear and east, west faces directed towards the sun S: its orientation in relation to the sun S changes during its orbit around the Earth. By contrast, as the first arm 7 can rotate on the body 2 of the satellite 1 by means of the mounting module 10, it always has the same orientation in relation to the sun S.

Thus, the utilization of the means for controlling a sun-synchronous rotation of the first arm 7 allows the first device 6 to follow the sun S despite the movement of the geostationary satellite 1, the orientation of which changes in relation to the sun S. Consequently, the second device 8 can be placed so that the first device 6 is interposed between the second device 8 and the sun S, so that at least a part of the rays R of the sun S directed towards the second device 8 do not reach it. In other words, the second device 8 is at least partially, and preferably completely, in the shadow of the first device 6.

To this end, for example, the two devices are put into an initial position in which the first device receives the rays R from the sun S, the second device being at least partially in the shadow of the first device or also, in other words, behind the first device 6 in relation to the sun S. Then, the means for controlling the sun-synchronous rotation of the first arm 7 ensure that this relative position between the two devices 6, 8 is maintained throughout the orbit of the satellite, i.e. the second device 8 remains at least partially in the shadow of the first device 6.

For example, for purposes of explanation, an axis O is defined, described as operational, not parallel to the axis of rotation A, and by which the first device 6 is oriented during its operation.

The operational axis O is defined here as being an axis attached to the first device 6, passing through at least one point of the first device 6 and aimed at at least one point on the sun S. The operational axis O is thus an axis by which the first device 6 is oriented in relation to the sun, so that the orientation of the first device 6 follows the sun S whilst the satellite 1 moves. In other words, the first arm 7, and therefore the first device 6, rotate with respect to the body 2 of the satellite 1 so that the operational axis O permanently points towards the sun S.

The second device 8 is then at least partially aligned with the operational axis O, i.e. generally so that at least one point of the second device 8 is on the operational axis O. As the first device 6 has a certain extension about the operational axis O, the second device 8 is therefore at least partially behind the first device 6. Thus, the first device 6 is interposed between the rays R of the sun S and at least a part of the second device 8, and the second device 8 is then in the shadow of the first device 6, i.e. the rays R of the sun S which, in the absence of the first device 6, would have reached the second device 8, are blocked by the first device 8. To this end, the first device 6 is designed to block the rays R of the sun, for example by being coated with a layer of a material blocking the rays R.

As the second device 8 is protected from the rays R by the first device 6, the temperature increase of the second device 8 is reduced. Thus, the first device 6 can be any device blocking the sun's rays R, and the second device 8 can be for example any device requiring a controlled temperature, which is as low as possible.

Due to the configuration of the mounting module 10 comprising the opening 11, and of the second arm 9 supporting the second device 8 passing through this opening 11, the first device 6 can rotate about the second device 8. The alignment between the operational axis O of the first device 6 and at least one point of the second device 8, which point can be moved over time, is then maintained throughout the movement of the satellite 1 in orbit. More specifically, when the first device 6 rotates so that the operational axis O remains substantially parallel to the direction of the rays R during the movement of the satellite in its orbit, the second device 8, fixed with respect to the body 2, always remains in the shadow of the first device 8.

A description will now be given of the particular embodiments with reference to the attached Figures.

FIGS. 1 to 14 show a craft 1 equipped with at least one pair 5 of supporting arms, and preferably two pairs 5a, 5b, according to the first embodiment, and the axis of rotation A is parallel to the axis Y of the satellite 1.

According to this first embodiment, in the case of each pair 5a, 5b, the second arm 9 is rigid and is aligned on the axis of rotation A, the second device 8 having a position that is fixed with respect to the body 2. More specifically, the second arm 9 and the second device 8 are comprised in a plane comprising the axis of rotation A, and are fixed with respect to the body 2 of the satellite 1, i.e. their position is fixed in time, at the very least at the time of the use of the second device 8. The first device 6 is offset with respect to the axis of rotation A.

More specifically, the first arm 7 comprises a proximal end portion 19 mounted on the outer periphery of the rotary part 13 and a distal end portion 20 on which is mounted the first device 6. By rotating on the fixed part 12, the rotary part 13 drives the first arm 7 and the first device 6. The brushes 17 in contact with the rings 15 ensure the electrical connection between the body 2 and the first device 6. The second arm 9 then passes through the opening 11 of the module 10. The second arm 9 has a proximal end portion 21 fixed to the portion of the body accessible via the opening 11 of the mounting module 10 and has a distal end portion 22 provided with the second device 8.

Moreover, in order that the first device 6 rotates about the second device 8, the first device 6 is at a greater distance from the axis of rotation A than the second device 8. Thus, a rotation of the first device 6 defines a cone or a cylinder in which the second device 8, the position of which with respect to the body 2 of the satellite 1 is fixed, is comprised.

Figure 3:
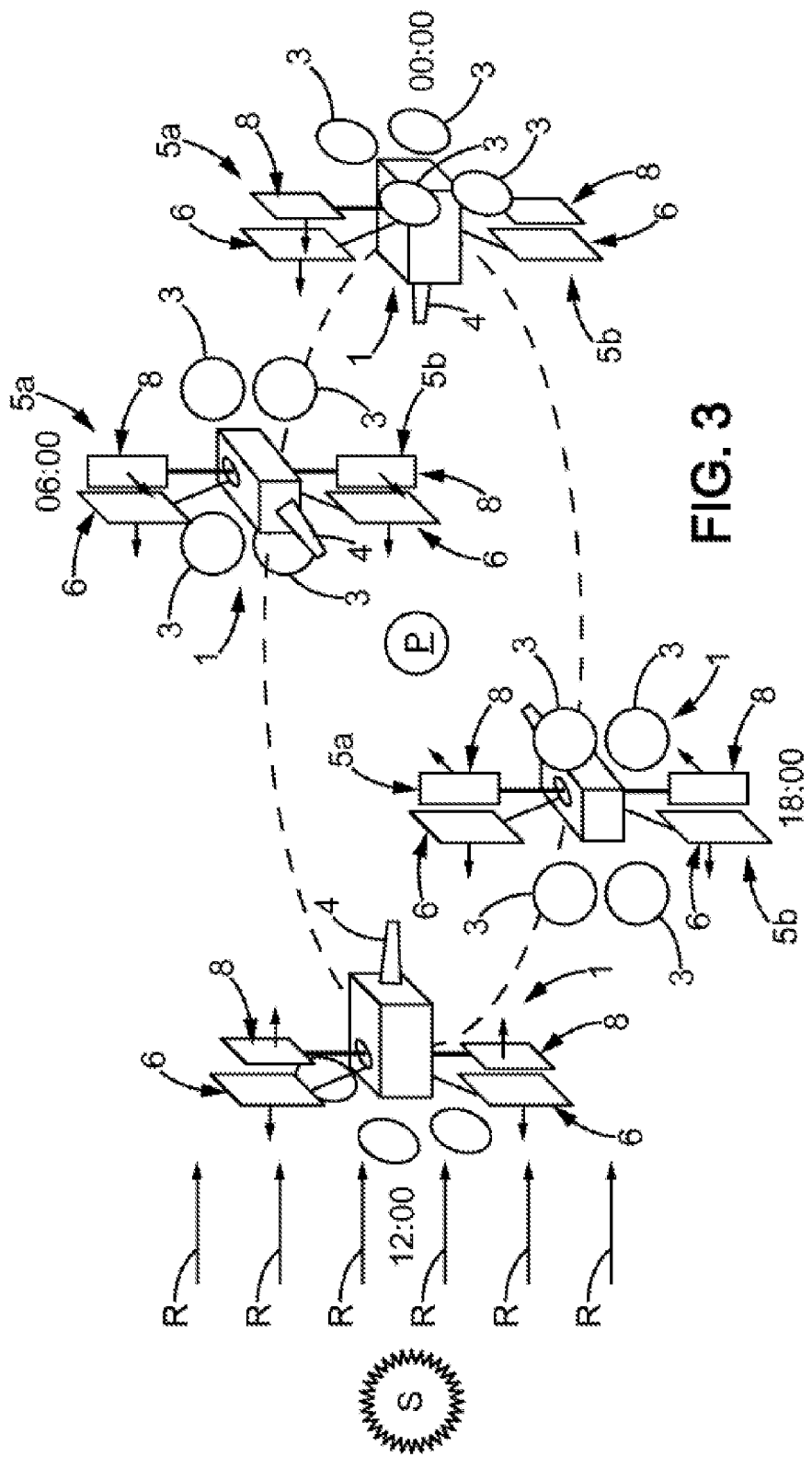
FIG. 3 is a diagrammatic representation of a space craft of the satellite type comprising two pairs of supporting arms according to the embodiment in FIGS. 1 and 2, according to a first mounting, the satellite being in orbit around a planet, four positions of the satellite, at different times, around the planet being shown in the same figure.
Figure 4:
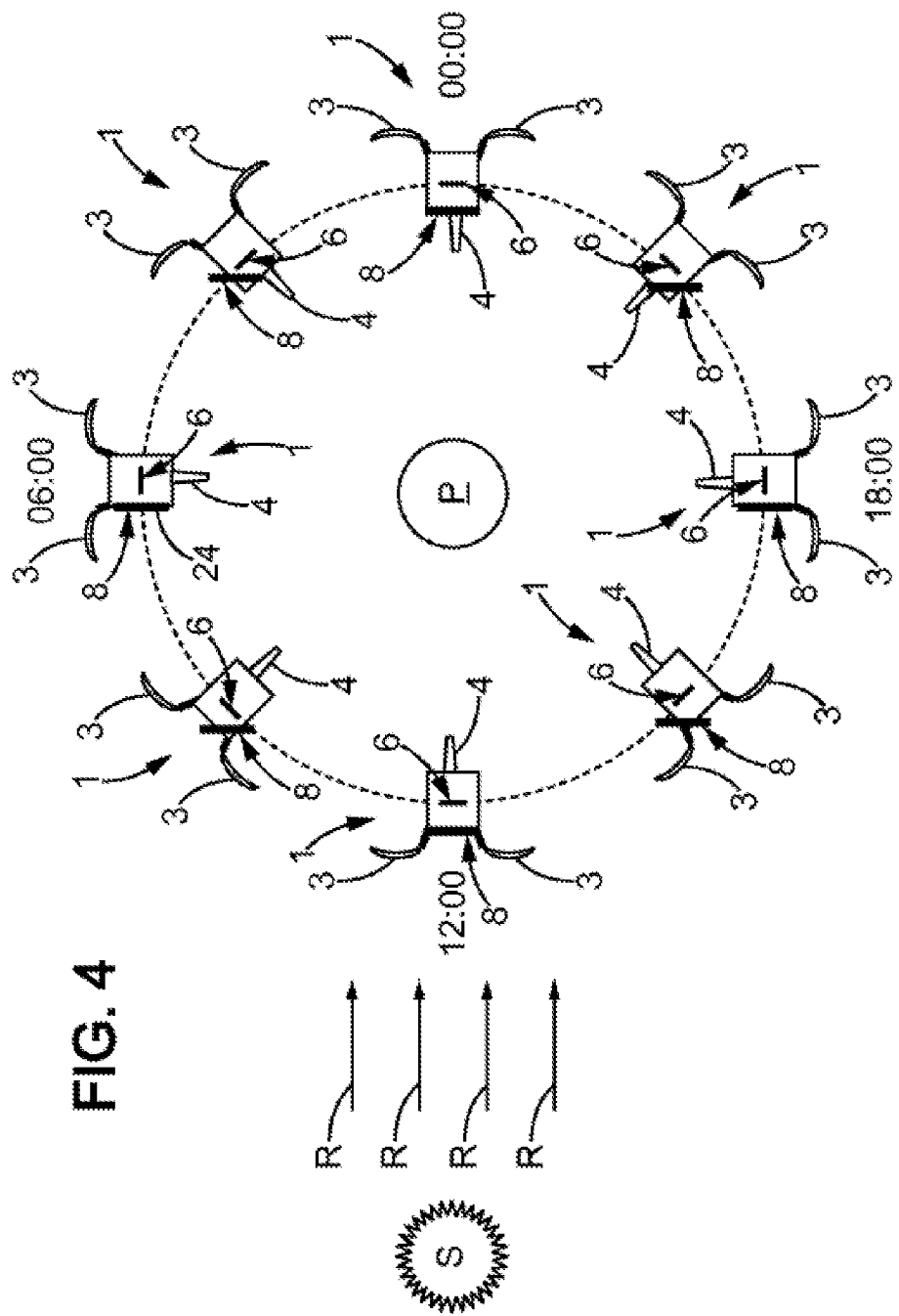
FIG. 4 is a top view of the satellite in FIG. 3, in eight different positions around the planet at different times.

FIGS. 3 to 5 show a first mounting of the craft 1 equipped with two pairs 5a, 5b of supporting arms.

According to a particular embodiment, the first device 6 comprises a solar panel 23, having a front face 24 covered with substantially flat photovoltaic cells. The operational axis O can then be defined as being the axis perpendicular to the front face 24, so that the front face 24 permanently faces the sun S, and is also parallel to the axis Y of the satellite 1. The second device 8 comprises for example a radiator 25, which is in the form of a panel with two substantially flat radiative opposite faces 26, perpendicular to the axis Z of the satellite 1, and by which the heat can be removed. In other words, the radiative faces 26 are oriented to the front and rear faces of the satellite 1. The radiator 25 comprises for example a plurality of channels crossing its radiative faces 26 in which a coolant fluid circulates. The relative position between the solar panel 23 and the radiator 25 is such that the front face 24 of the solar panel 23 is turned away from the radiator 25, the radiator 25 therefore facing a rear face of the solar panel 23 or, in other words, behind the solar panel 23 in relation to the sun S.

Although the solar panel 23 may be tiltable, hereafter it will be considered that the front face 24 remains perpendicular to the support face 18 of the body of the satellite 1, so that the operational axis O as defined above is perpendicular to the axis Y of the satellite 1. In this case, it can be considered that:

at the equinox, when the rays R are substantially parallel to the equatorial plane of the planet P, the operational axis O is parallel to the rays R;

at the summer solstice and at the winter solstice, when the rays R are inclined with respect to the equatorial plane of the planet P, typically by an angle of approximately 23.5° when the planet P is Earth, the operational axis O is inclined by the same amount with respect to the rays R.

In this case, the first arm 7 comprises electrical connection means 27 connecting with, as has been seen previously, the brushes 17 of the rotary part 13 of the mounting module 10; the second arm 9 comprises means 27' of fluid connection between the radiator 25 and the body 2 of the satellite.

The relative dimensions between the radiator 25 and the solar panel 23 are such that:

the width w of the radiative faces 26 of the radiator 25 is substantially equal to the width of the solar panel 23, and the height of the radiator 25 is less than or equal to the height of the solar panel 23, the distance d between the solar panel 23 and the axis of rotation A is equal to or very slightly greater than half of the width w of the radiator 25, in order to allow the solar panel 23 to adopt the positions indicated at 06:00 and at 18:00, i.e. when the operational axis O is parallel to the axis X of the satellite 1, while guaranteeing that the sun's rays R do not reach the radiator 25.

In the remainder of this document, the positions are indicated by times, in this case 00:00, 06:00, 12:00 and 18:00 as corresponding to the solar times at the point on the planet P above which the geostationary satellite 1 is placed. Thus, for example, the position indicated at time 0:00 corresponds to the solar time 0:00 (0 hour) at the point on the planet P above which the satellite 1 is placed.

The satellite 1 is placed in orbit around the planet P, following a trajectory shown in broken lines in FIG. 3. The sun S is situated sufficiently far away to consider that its incident rays R on the satellite 1 are substantially parallel to each other.

When the satellite 1 is in orbit around the planet P, the solar panel 23 maintains its relative position in relation to the radiator 25 by rotating on the body 2 of the satellite by means of the mounting module 10. The radiator 25, even while remaining fixed to the body 2 of the satellite, cannot be reached by the rays R of the sun S, or only very slightly, as the solar panel 23 is always interposed between the rays R and the radiator 25.

FIGS. 3 and 4 show what happens during one day of the planet P considered, i.e. one rotation on itself, for a few positions of the satellite 1, at the equinox. The radiator 25 is oriented along the axis Z of the satellite 1, i.e. its radiative faces 26 are perpendicular to the axis Z. For purposes of understanding, in FIG. 3, the front face 24 of the solar panel is marked with an arrow which is perpendicular thereto, and a first radiative face 26 of the radiator 25 is also marked with an arrow which is perpendicular thereto.

At the position marked 00:00, also shown in FIG. 5, the front face of the satellite 1 is directed towards the sun S, as well as towards the planet P. The operational axis O is parallel to the axis Z of the satellite 1. The radiator 25 is behind the solar panel 23, therefore in the shadow, the solar panel 23 being interposed between the rays R and the radiator 25. The front face 24 of the solar panel 23 and the first radiative face 26 of the radiator 25 are parallel, oriented in the same direction.

Figure 6:
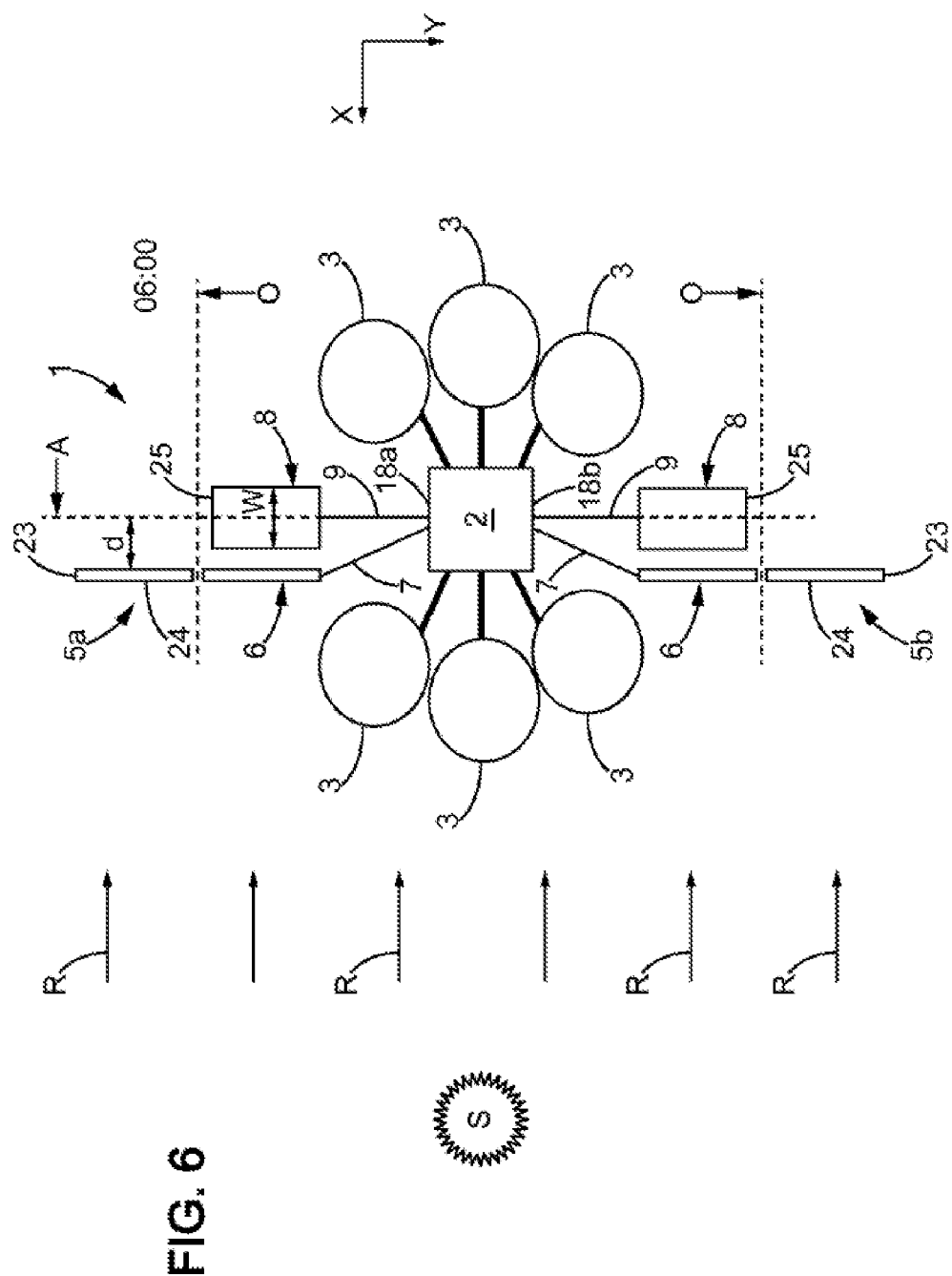
FIG. 6 is a side view of the satellite in the position at a point in time marked 06:00 around the planet in FIG. 3.

At the position marked 06:00, also shown in FIG. 6, the west face of the satellite 1 is directed towards the sun S. The solar panel 23 has rotated through 90° and the operational axis O is parallel to the axis X of the satellite 1. The radiative faces 26 of the radiator 25 are still oriented following the axis Z of the satellite 1. The radiator 25 is still behind the solar panel 23, in shadow. The front face 24 of the solar panel 23 and the first radiative face 26 of the radiator 25 are perpendicular.

Then, as the satellite 1 moves in its orbit in relation to the sun S to arrive at the position marked 12:00, the rear face of the satellite 1 is directed towards the sun S. The solar panel 23 has again rotated through 90°. The configuration between the radiator 25 and the solar panel 23 is then similar to that marked 0:00. The front face 24 of the solar panel 23 and the first radiative face 26 of the radiator 25 are again parallel, but oriented in two opposite directions.

Finally, the satellite arrives at the position marked 18:00. The solar panel 23 has again rotated through 90°. The configuration between the radiator 25 and the solar panel 23 is then similar to that marked 06:00. The front face 24 of the solar panel 23 and the first radiative face 26 of the radiator 25 are again perpendicular.

The front face 24 of the solar panel 23 is therefore permanently turned away from the radiator 25, along the operational axis O. Throughout the rotation of the solar panel 23, its front face 24 benefits from maximum sunlight, which contributes to a good efficiency of the solar panel 23. By contrast, the radiator 25 is in the shadow of the solar panel 23 throughout the operation of the satellite 1. In fact, the height and the width of the solar panel 23 are greater than those of the radiator 25. Moreover, by placing the radiator 25 as close as possible to the panel 23, i.e. at a distance d equal to or very slightly greater than half of the width w of the radiator 25 in order to allow the positions at 06:00 and at 18:00, the inclination of the orbit of the planet P around the sun S has little incidence or even none at all, as the rays R of the sun do not reach the radiator 25. It is therefore no longer necessary to cover the radiator 25 with reflecting mirrors (OSRs).

Furthermore, the thus-mounted radiator 25 performs better than a radiator of the state of the art, as will be disclosed in the comparison below of the total heat removed by a radiator on a geostationary satellite of the planet Earth.

In fact, as already described above, a satellite is conventionally in the form of a rectangular parallelepiped. Each of the front, rear, east and west faces in turn receives maximum sunlight when it is facing the sun, intermediate when it is side-on, then nil when it is facing away from the sun, depending on the position of the satellite around the planet P.

It is considered that all of the equipment of the satellite to be cooled form a thermal load. In order to allow a heat transfer between the thermal load and the radiator, the average temperature at the surface of the radiator $T_{surface}$ must be less than that of the thermal load $T_{load}$, i.e. there must be a thermal gradient $\Delta T$ between the radiator and the thermal load. However, the thermal load must not exceed a permitted maximum temperature $T_{maxlimit}$ beyond which the equipment no longer operates. For example, if the maximum permitted temperature $T_{maxlimit}$ is 343.15 K (Kelvin), and the thermal gradient $\Delta T$ must be 20, the temperature $T_{surface}$ must not exceed 323.15 K. Thus, the average temperature $T_{surface}$ at the surface of the radiator must correspond to the following relationship:

$$T_{surface} + \Delta T = T_{load} \leq T_{max\ limit}$$

According to the state of the art, the radiator is mounted against the north face or the south face, its single radiative face being turned towards space. The radiative face will receive sunlight which varies depending on the position of the planet around the sun. In fact, as the orbit of the planet around the sun is inclined, for example by 23.5° in the case of the Earth at the summer solstice, it is considered that the north face then receives maximum sunlight at the summer solstice and nil sunlight at the equinoxes and at the winter solstice. In order to reduce the absorption of the solar radiation so far as possible, mirrors (OSRs) are installed on the north face, so that the solar absorptivity of the radiator is as low as possible. In theory, the absorptivity of the mirrors is zero. However, over time, they deteriorate and allow a typical absorptivity value of 0.27.

The power $P_R$ radiated by the radiator, assuming that it absorbs no radiation is given by the Stefan-Boltzmann law:

$$P_R = \epsilon * \sigma * S * (T_{surface}^4)$$

Where:
$\epsilon$ is the emissivity of the radiator covered with mirrors, equal to 0.79,
$\sigma$ is the Stefan Boltzmann constant,
S is the radiative surface area of the radiator, Assuming, for the sake of simplicity, that the radiative surface area S of the radiator is 1 m² (square meter), the temperature of the thermal load $T_{load}$ is equal to the maximum permitted temperature $T_{maxlimit}$ of 343.15 K and a gradient $\Delta T$ of 20 is sufficient, the maximum radiated power $P_R$ is:

$$0.79 * \sigma * (343.15 - 20)^4 = 488\ W\ (Watts)$$

However, in practice, the radiator absorbs certain radiation.

In fact, as has been seen above, for example the north face at the summer solstice receives sunlight which is absorbed by the radiator. The environment of the radiator therefore varies as a function of the position of the Earth in its orbit around the sun. The power $P_{absorbedsolar}$ absorbed by the radiator on the north face at the summer solstice, assuming that the intensity of the solar flux is 1400 W/m² (Watts per square meter), is given by the following calculation:

$$P_{absorbedsolar} = 1400 * \sin(23.5°) * 0.27 = 151\ W$$

Moreover, the radiator is mounted close to the body of the satellite and other items of equipment, so that the field of view of the radiator is not completely turned towards cold space. Typically, it has been determined that the view factor of the radiator towards space is 95% (percent) and the view factor of the radiator towards the solar panel is 5%.

The view factor is here an assessment of the proportion of a surface area which is directly influenced by the thermal radiation of a body, such as the body of the satellite or a solar panel, or by the thermal radiation of a medium, such as space.

The temperature of space is 3 K (Kelvins), having a low radiation flux, typically 5 mW/m², (milliwatts per square meter). The solar panel is at a temperature of 323 K, and has a higher radiation flux, typically 620 W/m². The power budget absorbed by the radiator due to its environment $P_{environment}$ is then, still assuming a surface area of 1 m²:

$$P_{environment} = \frac{95}{100} * 0.005 + \frac{5}{100} * 620 = 31\ W$$

The net power rejection $P_{net}$ of the radiator, i.e. the power corresponding to the heat that the radiator can remove is:

$$P_{net} = P_R - P_{absorbedsolar} - P_{environment} = 488 - 151 - 31 = 307\ W$$

The above value corresponds to the worst of the situations for the north face, i.e. when it receives maximum sunlight at the summer solstice. Now, the useful power is a fixed value of the radiator. The radiator cannot therefore have a net power rejection greater than 307 W.

At the equinox, the sunlight received by the north face is nil, the inclination of the orbit of the Earth around the sun being 0°. The power $P_R$ radiated by the radiator is:

$$P_R = P_{net} + P_{absorbedsolar} + P_{environment} = 307 + 0 + 31 = 338\ W$$

From this, an average temperature $T_{surface}$ at the surface of the radiator of 295.15 K is deduced and thus, for the same thermal gradient $\Delta T$ of 20, the temperature $T_{load}$ of the load is 315.15 K, which is clearly below the maximum permitted temperature $T_{maxlimit}$.

As a result, the variation of the environment of the radiator during the operation of the satellite generates significant variations in the temperature of the equipment of the satellite and of the radiator.

Table 1 below summarizes the temperature $T_{load}$ of the thermal load for a radiator of the state of the art mounted on the north face of the satellite, at the summer solstice and at the equinoxes and at the winter solstice:

TABLE 1

| Condition | Sunlight received at the radiative face | Heat removed (in W) | $T_{surface}$ (in K) | $\Delta T$ | $T_{load}$ (in K) |
|---|---|---|---|---|---|
| summer solstice | maximum | 307 | 323.15 | 20 | 343.15 |
| equinoxes and winter solstice | nil | 307 | 295.15 | 20 | 315.15 |

The radiator performance is therefore dimensioned by the need to limit the temperature of the load taking into account the worst conditions, i.e., for the north face, at the summer solstice, with maximum sunlight. Now, these conditions appear only for a limited period of a few days per year, and the rest of the year, the temperature of the load and of the radiator are not as high, making the radiator less efficient. Moreover, this variation in temperature has undesirable effects on the operation of the payload, for example causing accelerated ageing due to the thermoelastic stress induced on the heat-sensitive components.

According to an embodiment of the invention, in which the radiator 25 is mounted on the second arm 9, itself mounted for example on the north face, the sunlight received is nil irrespective of the position of the Earth in relation to the sun, since, as seen previously, the radiator 25 is always in the shadow of the solar panel 23.

Moreover, the radiator 25 can remove heat by means of both of its radiative faces 26.

There too, the heat removed by the radiator 25 according to the Stefan-Boltzmann formula is a function of the average temperature $T_{surface}$ of the surface of the radiator 25, which is the same for both radiative faces 26. $T_{surface}$ is taken, as previously, as 323.15 K, i.e. in order to reach a temperature of the load $T_{load}$ equal to the maximum permitted temperature $T_{maxlimit}$ of 343.15 K, and for a thermal gradient $\Delta T$ of 20. Moreover, as mirrors are no longer necessary, the radiator 25 can be covered with a coat of paint increasing the emissivity to 0.9. Thus, the power $P_{Rface1}$ and $P_{Rface2}$, radiated by each radiative face 26 is:

$$P_{R,face1}=P_{R,face2}=0.9*\sigma*(323.15^4)=555 \text{ W}$$

Considering the situation at 00:00, a first radiative face 26 is parallel to the solar panel 23. It has been determined that the main items of equipment in its field of view are in particular:

the rear face of the solar panel 23, with a view factor of 40%, at a temperature of 323.15 K, and generating a radiation flux of 620 W/m²;

the body 2 of the satellite 1, with a view factor of 5%, at a temperature of 313.15 K, and generating a radiation flux of 430 W/m².

The rest has a view factor to space at 3K, with a radiation flux of 5 mW/m².

Thus, still assuming a surface area of 1 m², the heat flux $P_{environment,face1}$ received from the environment of the radiator 25 on this first radiative face 26 is:

$$P_{environment,face1} = \frac{40}{100}*620 + \frac{5}{100}*430 + \frac{55}{100}*0.005 = 269 \text{ W}$$

The second radiative face 26 has its field of view up to 5% obscured by the body 2 of the satellite, the rest being turned towards space. The heat flux $P_{environment,face2}$ received from the environment of the radiator 25 on this second radiative face 26 is:

$$P_{environment,face1} = \frac{5}{100}*430 + \frac{95}{100}*0.005 = 22 \text{ W}$$

As a result, the so-called useful power budget of the radiator 25, at 00:00, i.e. the power corresponding to the heat that the radiator can remove is:

$$(P_{R,face1}-P_{environment,face1})+(P_{R,face2}-P_{environments,face2})=(555-269)+(555-22)=820 \text{ W}$$

The value for the position at 12:00 is the same.

The same calculation can be repeated for the position of the satellite at 06:00, in which the radiative faces 26 of the radiator 25 are oriented perpendicular to the solar panel 23. The environment of the two radiative faces 26 is similar, and it has been determined that for each face, the main items of equipment in the field of view are in particular:

the solar panel 23, with a view factor of 15%, at a temperature of 323.15 K, and generating a radiation flux of 620 W/m²;

the body 2 of the satellite 1, with a view factor of 5%, at a temperature of 313.15 K, and generating a radiation flux of 430 W/m².

The rest has a view factor to space at 3 K, with a radiation flux of 5 W/m².

The heat flux received from the environment of the radiator 25 on each radiative face 26 is:

$$P_{environment,face1} = P_{environment,face2}$$

$$\frac{15}{100}*620 + \frac{5}{100}*430 + \frac{80}{100}*0.005$$

$$= 114 \text{ W}$$

As indicated for the example of the state of the art, the useful power remains constant throughout the operation of the satellite.

From this, an average temperature $T_{surface}$ at the surface of the radiator of 318.15 K is deduced, and thus, for the same thermal gradient $\Delta T$ of 20, the temperature $T_{load}$ of the load is 338.15 K.

The value for the position at 18:00 is the same.

Table 2 below summarizes the maximum temperature $T_{max}$ of the thermal load for a radiator 25 mounted on the second arm 9 in the shadow of the solar panel 23, at the four positions 00:00, 06:00, 12:00 and 18:00:

TABLE 2

| Condition | View factor towards the solar panel (23) | | Heat removed (in W) | $T_{surface}$ (in K) | $\Delta T$ | $T_{load}$ (in K) |
|---|---|---|---|---|---|---|
| | 1st face | 2nd face | | | | |
| 00:00 | 40% | 0% | 820 | 323.15 | 20 | 343.15 |
| 06:00 | 15% | 15% | 820 | 318.15 | 20 | 338.15 |
| 12:00 | 0% | 40% | 820 | 323.15 | 20 | 343.15 |
| 18:00 | 15% | 15% | 820 | 318.15 | 20 | 338.15 |

The changes in the environment of the radiator 25 during the operation of the satellite have little impact on the temperature of the radiator 25 and the equipment of the satellite 1. Thus, the variation in temperature $T_{load}$ of the thermal load is only 5 K. The undesirable effects linked to the thermoelastic effects are clearly reduced.

Moreover, as it is not necessary to install mirrors, the performance of the radiator 25 remains substantially constant throughout the lifetime of the satellite.

More specifically, installing two pairs 5a, 5b of supporting arms on the satellite 1 makes it possible to achieve performance more than twice as high as that of the radiators of the state of the art, in particular through the use of four radiative faces 26 instead of two. By adding radiators according to the state of the art to the north and south faces, the overall performance is tripled.

Figure 7:
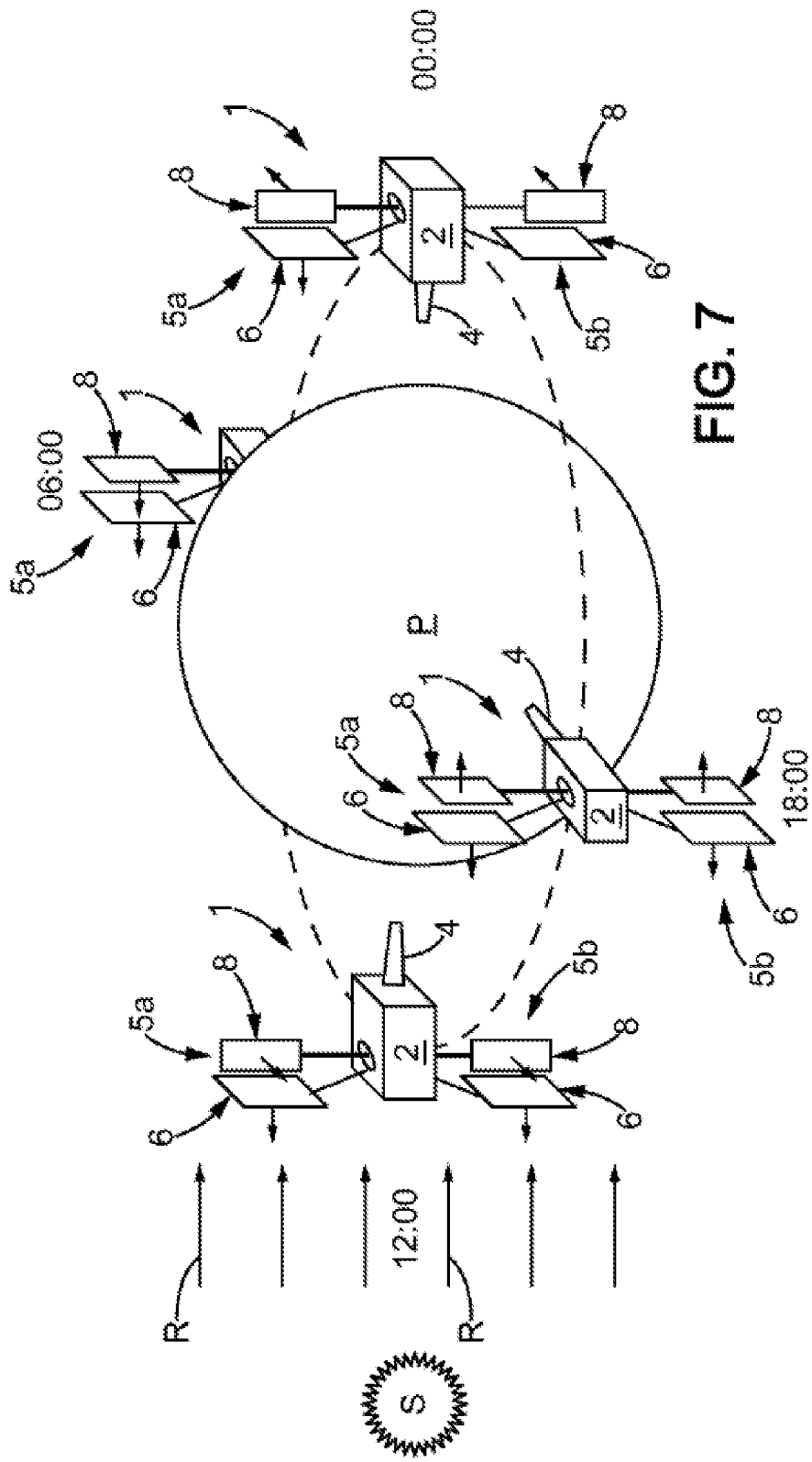
FIG. 7 is a diagrammatic representation similar to that in FIG. 3, according to a second mounting.
Figure 8:
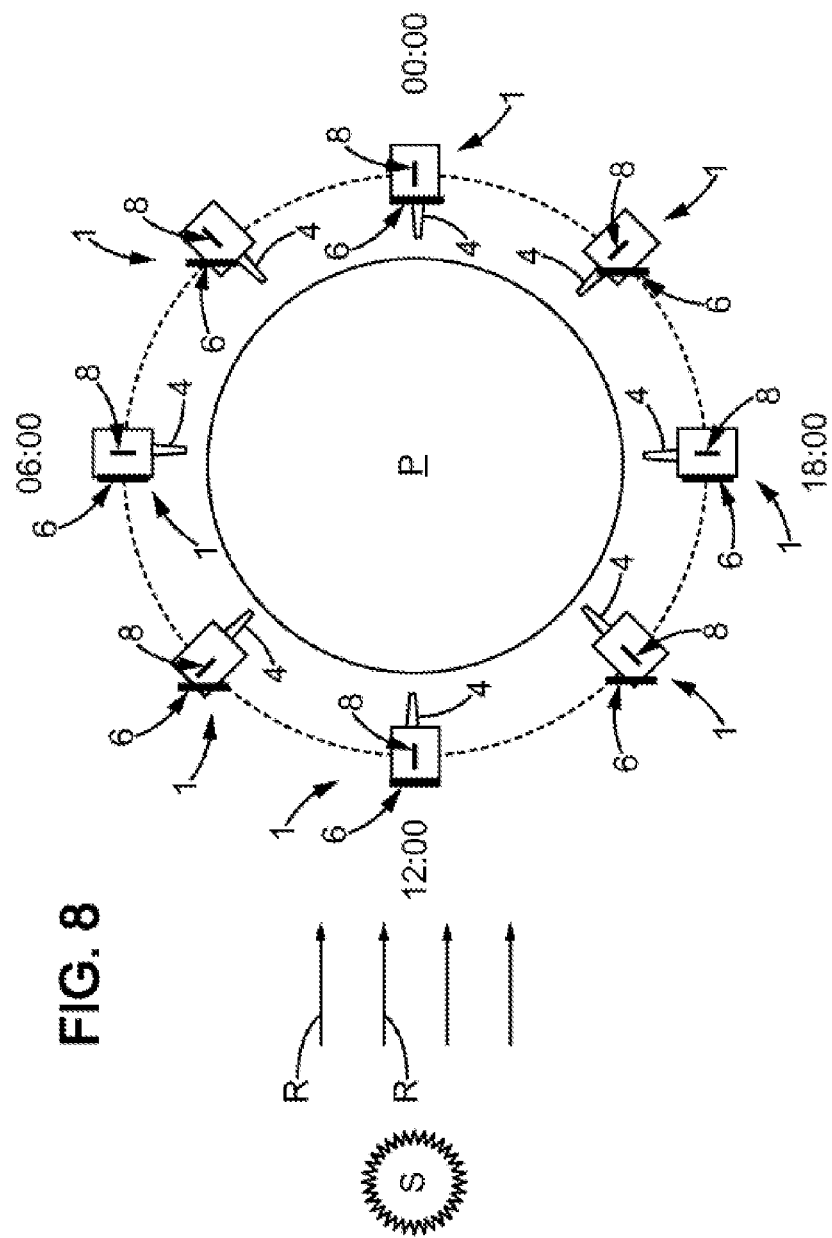
FIG. 8 is a top view of the satellite in FIG. 7 in eight different positions.
Figure 10:
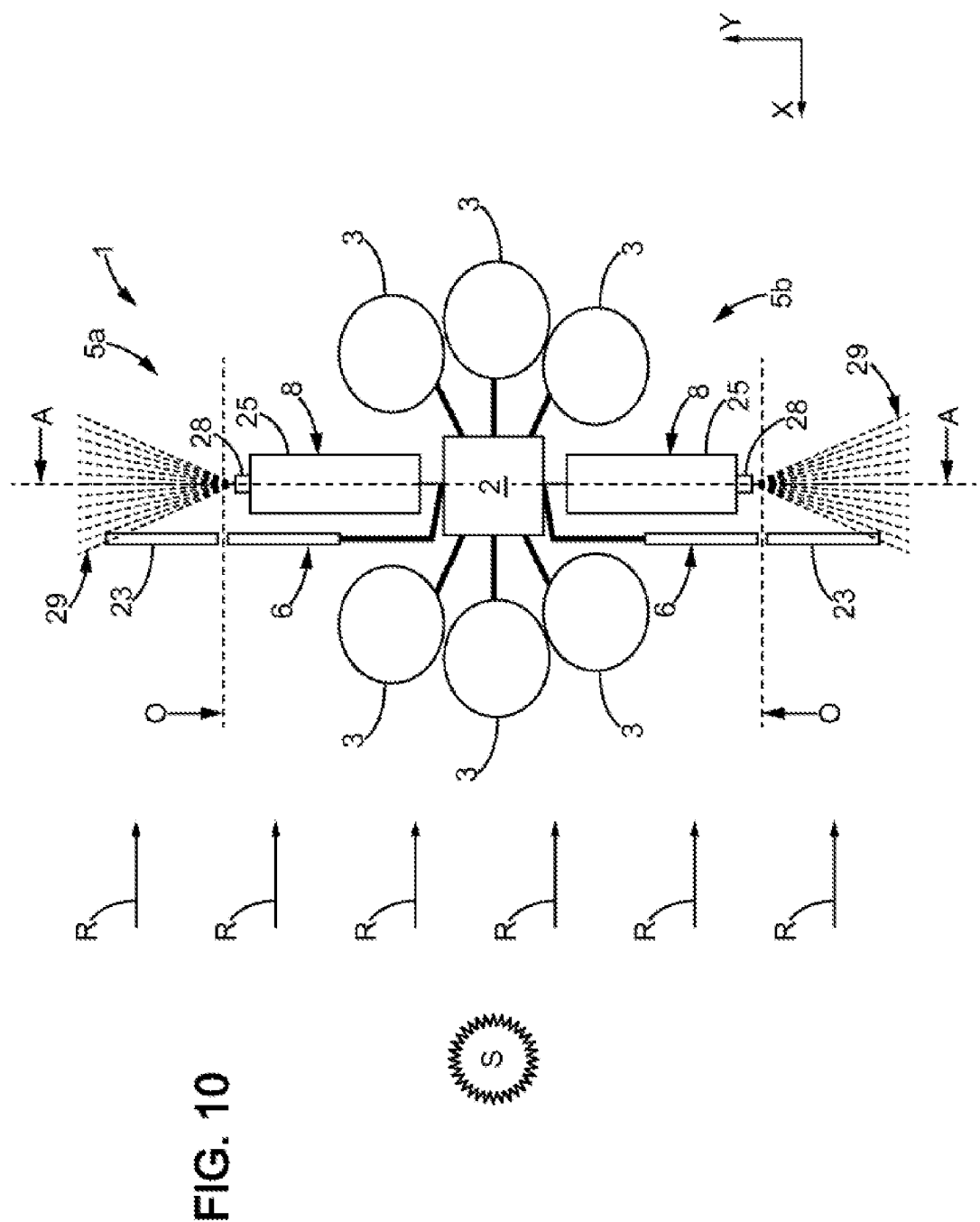
FIG. 10 is a side view of the satellite according to a third embodiment variant.

FIGS. 7 and 8 show a second mounting of a pair 5 of supporting arms on the satellite 1. In FIG. 7, similarly to FIG. 3, the front face 24 of the solar panel 23 is marked with an arrow which is perpendicular thereto, and a first radiative face 26 of the radiator 25 is also marked with an arrow which is perpendicular thereto.

In this second mounting, the radiator 25 is oriented along the axis X, i.e. its radiative faces 26 are substantially perpendicular to the axis X of the satellite 1. In other words, the radiator 25 is offset by 90° with respect to the first mounting, whilst the solar panel 23 rotates as previously in order to maintain its relative position in relation to the radiator 25. This second mounting is of particular benefit when the planet P is a hot spot for the satellite 1.

Thus, at the position marked 0:00, the operational axis O is perpendicular to the axis X, and protects the radiator 25 from the sun's rays R, and also from the radiation of the planet P, which is parallel to the direction Z of the satellite. The first radiative face 26 is perpendicular to the front face 24 of the solar panel 23. At the position marked 12:00, the configuration between the solar panel 23 and the radiator is substantially the same. The solar panel 23 no longer blocks the radiation of the planet P which then reaches the radiator 25. However, as the radiator 25 is oriented along the axis X, the radiative faces 26 are not facing the planet P, so that they are not completely reached by the radiation of the planet P.

At the position marked 06:00, the operational axis O is parallel to the axis X, and the solar panel 23 still protects the radiator 25 from the rays R. Little or no radiation from the planet P, still parallel to the axis Z of the satellite, reaches the radiative faces 26 of the radiator 25. The first radiative face 26 is parallel to the front face 24 of the solar panel 23. At the position marked 18:00, the configuration between the solar panel 23 and the radiator is substantially the same.

Thus, the radiator 25 is always shielded from the rays R of the sun S, whilst the radiation from the planet P has only a little influence on its temperature.

According to a particularly advantageous embodiment, the arms 7 and 9 are foldable with respect to the support face 18. To this end, the arms 7, 9 are rotatably articulated with respect to the body 2, along an axis of articulation perpendicular to the axis of rotation A. Each arm 7, 9 can thus assume two extreme positions:

a deployed position, in which the arm 7, 9 considered projects from the corresponding support face 18, for example substantially parallel to the axis Y of the satellite 1, a stowed position, in which the arm 7, 9 considered is brought substantially parallel to the corresponding support face 18, for example substantially perpendicular to the axis Y of the satellite 1.

For example, the proximal end portion 19 of the first arm 7 is mounted rotating on the outer periphery of the rotary part 13 of the mounting module 10 about a direction parallel to the axis of articulation, and the first device 8, in this case the solar panel 23, is mounted rotating about a direction parallel to the axis of articulation on the distal end portion 20 of the first arm 7. The second arm 9 has for example a flexibility at least on its proximal end portion 21 allowing a rotation about a direction parallel to the axis of articulation by folding.

In the stowed position of the two arms 7, 9 (FIG. 9a), the radiator 25 is against the support face 18 and the solar panel 23 is superimposed on the radiator 25. In other words, the radiative faces 26 of the radiator 25 and the front face 24 of the solar panel 23 are substantially perpendicular to the axis Y of the satellite.

In order to move the two arms 7, 9 into the deployed position, the solar panel 23 is pivoted on the distal end portion 20 of the first arm 7 (FIG. 9b), then the first arm 7 is pivoted into the deployed position (FIG. 9c). Finally, the second arm 9 is brought into the deployed position by means of its flexibility (FIG. 9d), so that the radiator 25 is brought onto the axis of rotation A.

The stowed position of the two arms 7, 9 is of particular benefit during the launch of the satellite. In fact, in the launch phase, the satellite is advantageously as compact as possible in order to be placed in a launch vehicle. It is only once in orbit that the arms 7, 9 can be put into the deployed position.

Figure 12:
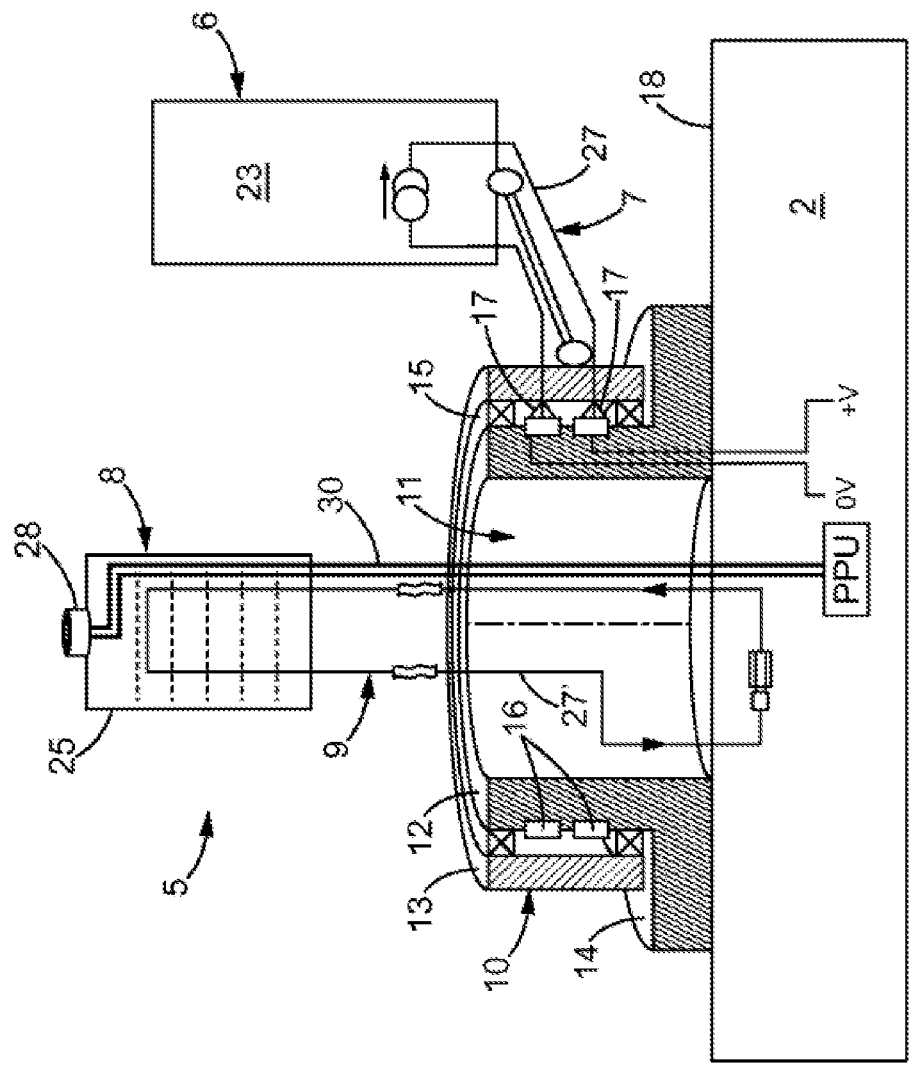
FIG. 12 is a cross-sectional view of the embodiment variant in FIG. 10.
Figure 14:
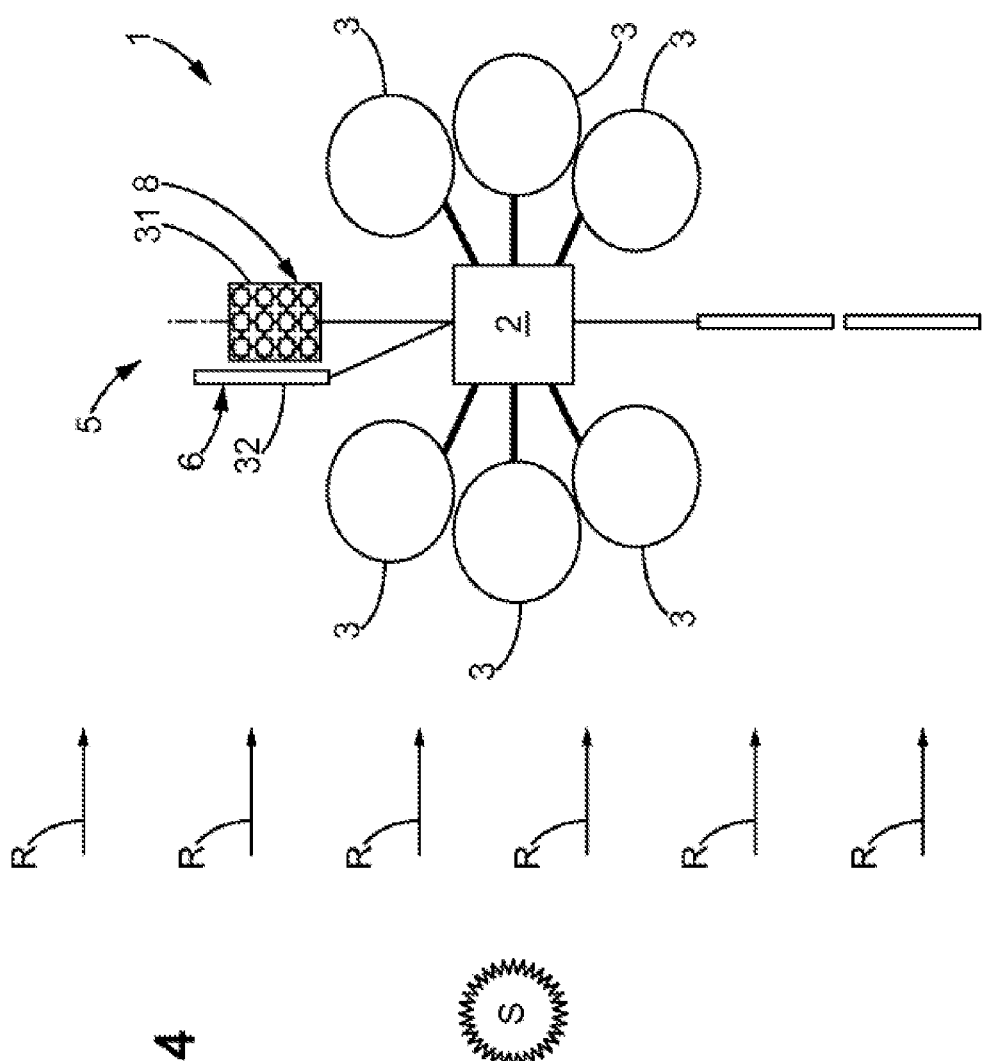
FIG. 14 is a side view of the satellite similar to that in FIGS. 6 and 13, according to an embodiment variant.

As a variant, shown in particular in FIGS. 12 and 13, the second device 8 comprises a nozzle 28 of a motor, for example a plasma thruster, in addition to the radiator 25. The nozzle 28 can be placed on the distal end portion 22 of the second arm 7 beyond the radiator 25, in the extension of the second arm 9, and more specifically in the alignment of the axis of rotation A. The mounting module 10 can then equally well be in the form of a ring or in flattened form. When the axis of rotation A is parallel to the axis Y of the satellite 1, the jet 29 of plasma originating from the nozzle 28, directed in the direction Y of the satellite 1, is then at a sufficient distance from the other devices of the satellite 1 not to impede or even damage the other equipment of the satellite 1. Moreover, the plasma jet 29 is then, in the worst configuration, in contact with the rear face of the solar panel 23, opposite the fragile front face 24, covered with the photovoltaic cells. As a result, the plasma jet 29 does not damage the photovoltaic cells. Moreover, the nozzle 28 is shielded from the sun's rays by the solar panel 23, simplifying the heat control. In fact, during the normal operation of the plasma thrusters, a significant quantity of heat can be released, which must be removed into space in order to prevent the nozzles 28 overheating. Protecting the nozzles 28 from the rays R of the sun S makes it possible to reduce the size, mass and complexity of the heat control system of the satellite 1.

In the same way as previously, in the stowed position of the two arms 7, 9, the radiator 25 and the solar panel 23 are oriented perpendicular to the axis Y of the satellite 1. The nozzle 28 is then oriented so that the plasma jet 29 is oriented in a direction parallel to the axis Z of the satellite 1 (FIG. 11a).

When the first arm 7 is put into the deployed position (FIG. 11b), the motor can be put into operation for example in order to move the satellite 1.

Furthermore, the second arm 9 can assume a position intermediate to the deployed position and the stowed position, in which it forms a non-zero angle with the axis Z. In this intermediate position, the plasma jet 29 is also oriented in a direction forming a non-zero angle with the axis Z of the satellite 1, so as to be able to adjust the position of the satellite 1 while moving the satellite 1 (FIG. 11c).

When the two arms 7, 9 are in the deployed position (FIG. 11d), the plasma jet 29 is then advantageously oriented only in the direction Y, making it possible to adjust only the position of the satellite 1. In this position, the plasma jets 29 ejected from the nozzles 28 of each pair 5a, 5b of supporting arms are at a sufficient distance, due to the second arm 9, from the body 2 of the satellite 1 as well as from the equipment of the satellite not to impede or damage the equipment, as seen previously. Moreover, the motors being generally utilized in order to maintain or correct the position of the satellite along the north-south axis Y of the satellite 1, the fact that the plasma jets 29 are oriented only along the axis Y makes it possible to optimize fuel consumption.

In order to allow the mounting of the motor 28 on the second arm 9, in addition to the radiator 25, the second arm 9 comprises suitable connections 30 passing through the opening 11 of the module 10 in order to connect the nozzle 28 to a PPU control unit.

As a variant, as shown in FIG. 13, the second device 8 can comprise only one plasma thruster 28, placed at the distal end of the second arm 9.

Also as a variant, the satellite 1 can comprise a single pair 5 of supporting arms, placed on a support face 18, for example the north face, whilst on the south face, the satellite 1 comprises a solar panel rotatably mounted on the body 2. The second device 8 of the pair 5 can be for example a phased array antenna 31, which generates heat. The first device 6, blocking the rays R of the sun S arriving on the antenna 29, can be, as previously, a solar panel or more generally a blocking panel 32, coated with a layer of a material blocking the rays R of the sun S but allowing the waves necessary for the operation of the antenna 31 to pass through. Thus, an increase in the temperature of the antenna 31, due to the rays R, which could impair the correct operation of the antenna 31, is limited. Provision can be made for the first device 6 to comprise both a solar panel 23 and a blocking panel 32, for example mounted one after the other along the first arm 7.

Generally, any pair 5 of supporting arms 7, 9 advantageously comprises a first device 6 capable of blocking the rays R of the sun, or any other source of rays capable of increasing the temperature, and a second device requiring control of its temperature, shielded so far as possible from the heating rays.

FIGS. 15 to 22 show a craft 1 equipped with at least one pair 5 of supporting arms, and preferably two pairs 5a, 5b, according to a second embodiment.

According to this second embodiment, the second arm 9 comprises at least one portion flexible about any direction perpendicular to the axis of rotation A, and the second device 8 is offset with respect to the axis of rotation A, about which it rotates due to the flexibility of the second arm 9. To this end, for example, the means 17 of fluid connection between the body 2 and the second device 8 are flexible tubes. The first arm 7 and the first device 6 are aligned on the axis of rotation A. More specifically, the first arm 7 and the first device 6 are comprised in a plane comprising the axis of rotation A. Here too, the axis of rotation A is parallel to the axis Y of the satellite 1.

According to an embodiment example, the rotary part 13 of the mounting module 10 is provided with two diametrically opposed lugs 35. The first arm 7 comprises two branches 36, fixed to the lugs 36 of the rotary part 13. Thus, the plane comprising the two branches 36 of the first arm 7 also comprises the axis of rotation A.

The second arm 9 comprises at least one flexible proximal end portion 33 fixed to the support face 16 of the body 2 of the satellite, passing through the opening 11 of the mounting module 10. The distal end portion 34, on which the second device 8 is mounted, can be rigid or not. The proximal end portion 33 is flexible about the axis Y of the satellite 1, so that, as shown by broken lines in FIGS. 15 and 18, a point M of the second device 8 can describe a circle in a plane parallel to the axes Z and X of the satellite 1, the centre of which is on the axis of rotation A. The second arm 9 comprises, as has been seen above, at least one point F fixed with respect to the body 2. For example, the second arm 9 comprises at least one point on the axis of rotation A. The second arm 9 is then inclined at a angle β with respect to the axis of rotation A, and therefore with respect to the first arm 7, so that the second device 6 is offset with respect to the axis of rotation A.

FIGS. 15 to 20 show an example mounting of a pair 5, and preferably of two pairs 5a, 5b, of supporting arms according to the second embodiment on the satellite 1 in which, as previously, the first device 6 comprises a solar panel 23 and the second device 8 comprises a radiator 25, the radiative faces 26 being perpendicular to the axis Z of the satellite.

Figure 16:
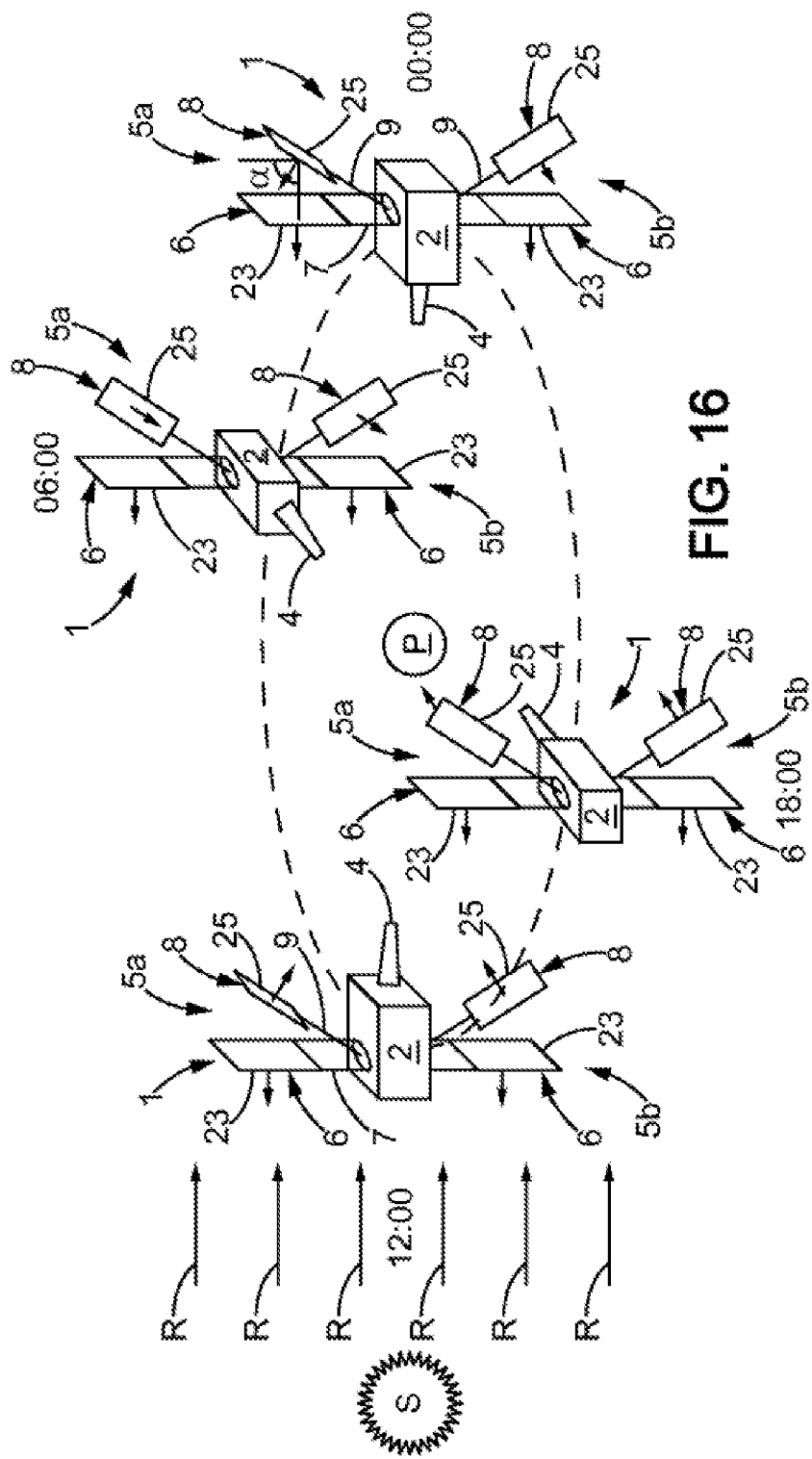
FIG. 16 is a diagrammatic representation of a space craft of the satellite type comprising two pairs of supporting arms according to the embodiment in FIG. 15, the satellite being in orbit around a planet, four positions of the satellite, at different times, being shown in the same figure.
Figure 17:
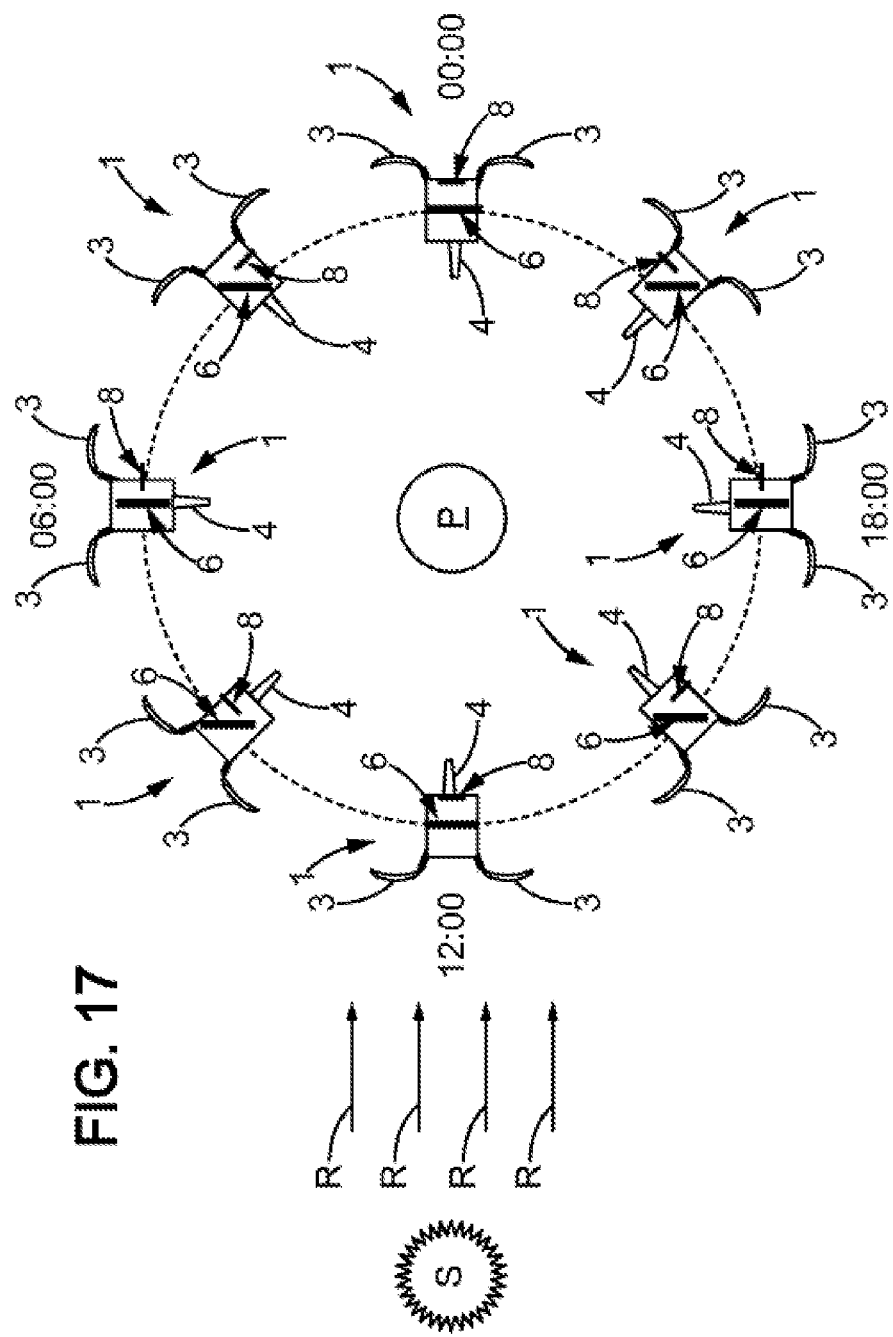
FIG. 17 is a top view of the satellite in FIG. 16, in eight different positions around the planet.

FIGS. 16 and 17, in a manner substantially similar to FIGS. 3 and 4, show a few positions of a satellite 1 in orbit around a planet P.

At the position marked 00:00, as previously, the operational axis O is parallel to the axis Z of the satellite. The radiator 25 is in the shadow of the solar panel. The radiative faces 26 are comprised in a plane that is inclined with respect to the axis of rotation A of the angle β and parallel to the axis X.

When the solar panel 23 rotates through 90° to arrive at the position marked 06:00, the operational axis O is parallel to the axis X of the satellite 1. In order to allow the rotation of the solar panel 3, the second arm 9 has rotated by a quarter of a circle about the axis Y, in a positive (+) direction along the axis Z and in a negative (−) direction along the axis X. The radiative faces 26 are perpendicular to the axis Z of the satellite.

Then, the solar panel 23 continues to rotate so that its operational axis O follows the rays R of the sun S during the movement of the satellite 1, and is again parallel to the axis Z at the position marked 12:00. At the same time, the second arm 9 has also rotated about the axis Y of the satellite by a quarter of a circle, in a positive (+) direction along the axis Z and in a positive (+) direction along the axis X.

The panel 23 continues to rotate following the rays R of the sun S and arrives at the position marked 18:00 in which the operational axis O is again parallel to the axis X of the satellite 1. There too, the second arm 9 has rotated a quarter of a circle about the axis Y of the satellite, in a negative (−) direction along the axis Z and in a negative (−) direction along the axis X.

Figure 18:
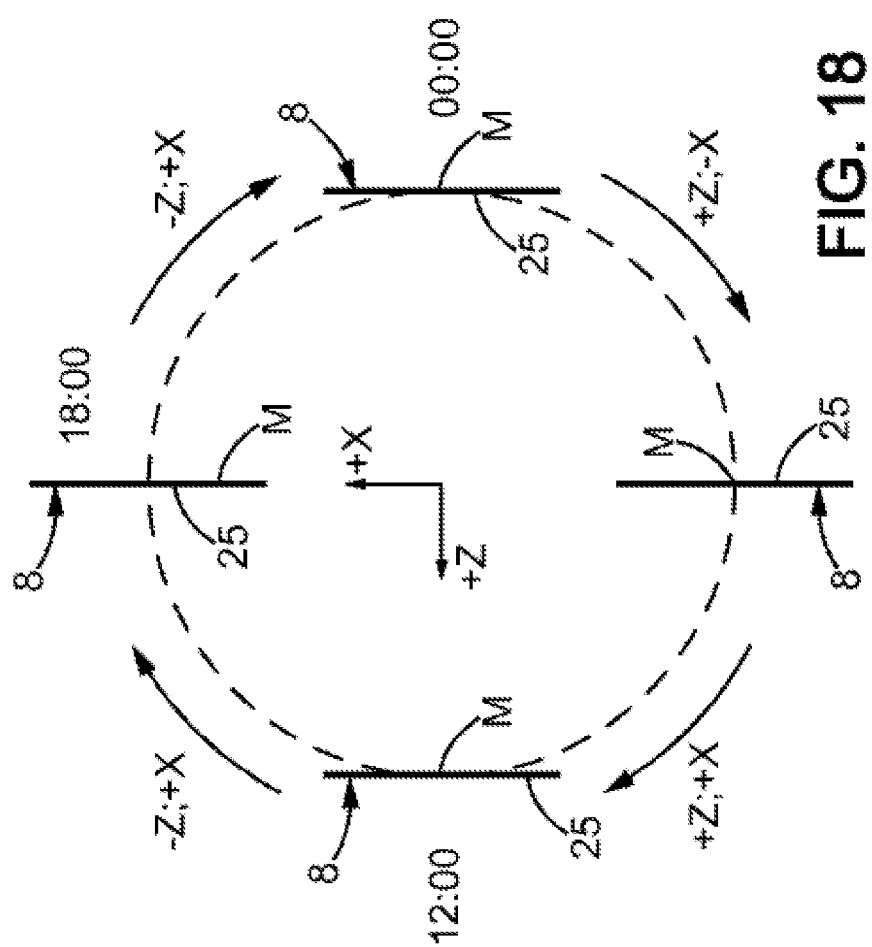
FIG. 18 is a diagrammatic representation of the movement of a device on the satellite of FIG. 16.
Figure 20:
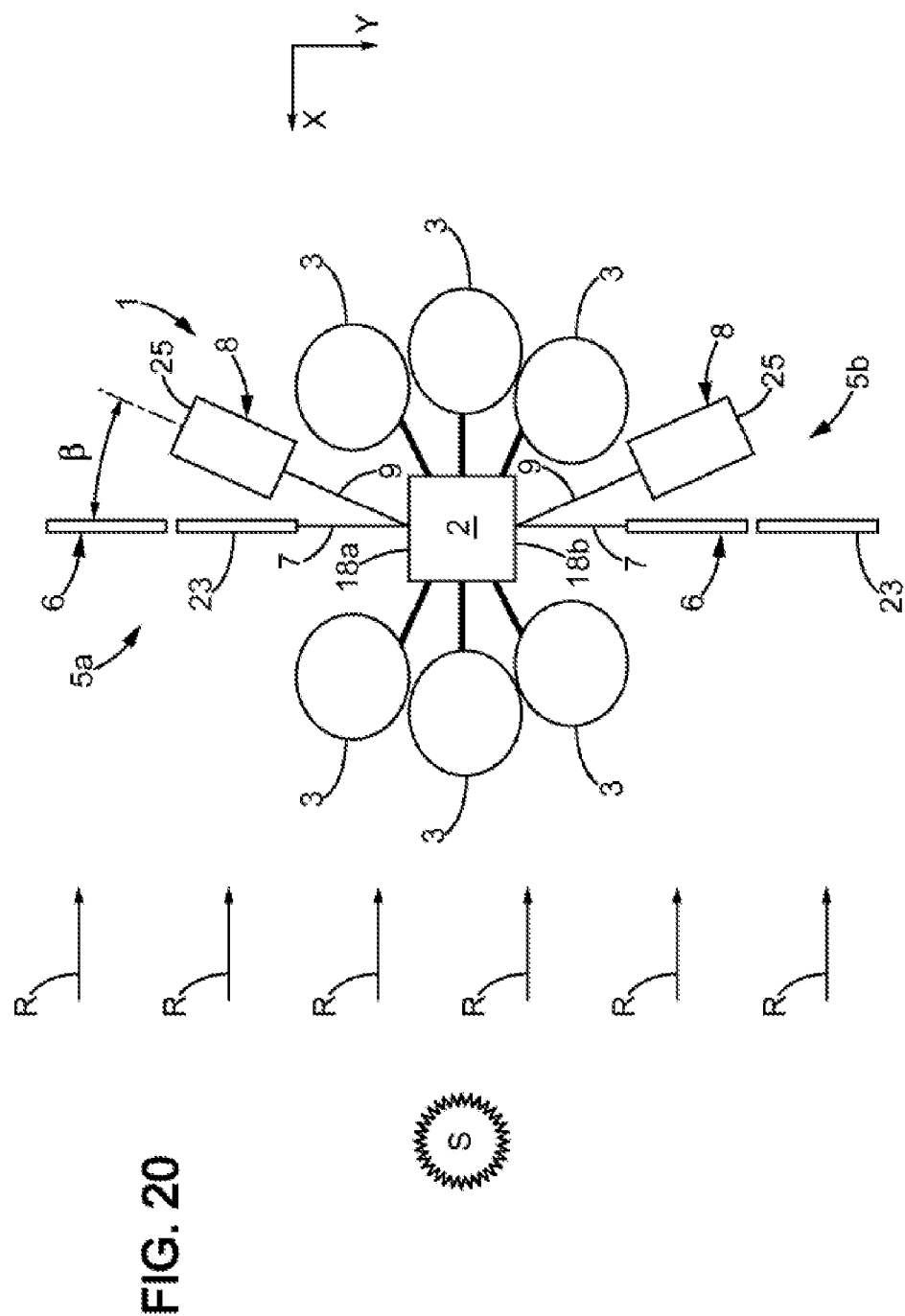
FIG. 20 is a view similar to that in FIG. 19, the satellite being in the position at a point in time marked 18:00 in FIG. 19 around the planet.

FIG. 18 shows diagrammatically the different positions of the radiator 25 alone, rotating about the axis Y of the satellite, the sign (+) or (−) in front of the axis Z or X indicating a positive or negative direction respectively, along the axis in question.

The efficiency of the radiator 25 to dissipate heat can be increased by optimizing the angle β of inclination of the second arm.

Moreover, in the same way as previously, the length of the arms 7, 9 is chosen so that the solar panel 23 and the radiator 25 do not impede the other equipment of the satellite 1, and in particular do not obstruct the field of view of the antennas 3, 4.

Finally, in the same way as previously, the first arm 7 and the second arm 9 can be articulated on the body of the satellite about an axis of articulation, so that the arms 7, 9 can assume a folded position and a deployed position. For example, the proximal portion 19 and the distal portion 20 of the first arm 7 are each mounted rotating about a direction parallel to the axis of articulation on the mounting module 10 and on the first device 6 respectively. Similarly, the proximal portion 33 and the distal portion 34 of the second arm 9 are each mounted rotating about a direction parallel to the axis of articulation on the body 2 of the satellite 1 and on the second device 8 respectively.

In order to further reduce the spatial requirement of the satellite 1, in particular during launch, before it is put into orbit, each arm 7, 9 and/or each device 6, 8 can comprise several sections rotatably articulated with respect to each other, so that they can stack on top of one another when the arms 7, 9 are in the stowed position.

For example, as shown in FIGS. 21a to 21e, the first arm 7 comprises a single section and the first device 6 comprises several successive sections 6.1, 6.2 and 6.3, the first section 6.1 of the first device 6 being mounted pivoting on the distal end of the first arm 7. The second arm 9 comprises a single section, just like the second device 8.

Figure 21A:
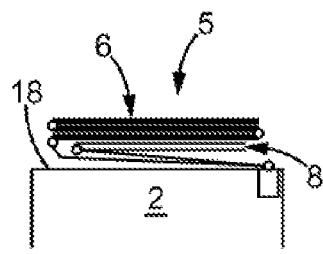
FIGS. 21a to 21e are perspective diagrammatic representations showing the kinematics of deployment of the arms of the second embodiment.
Figure 21B:
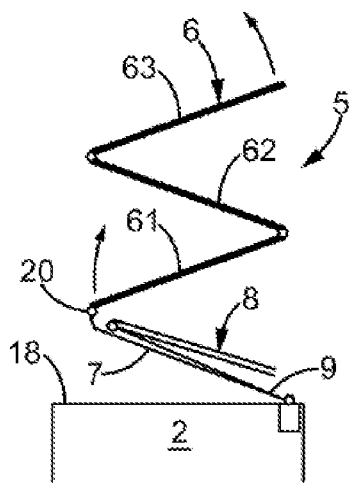
Figure 21C:
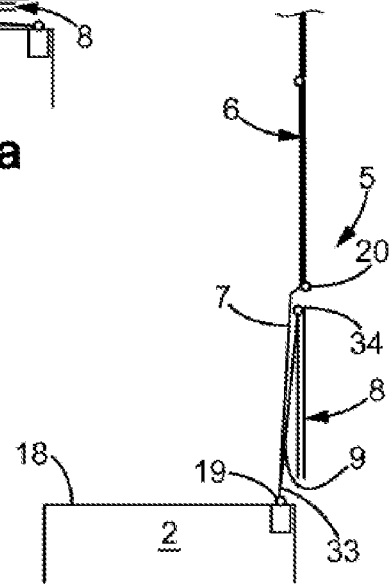
Figure 21D:
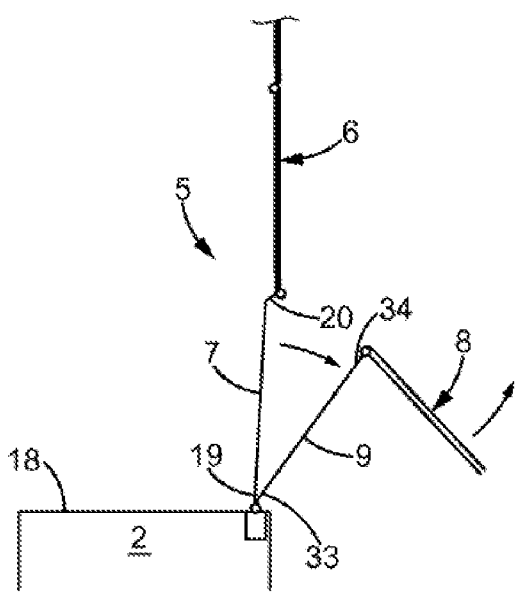
Figure 21E:
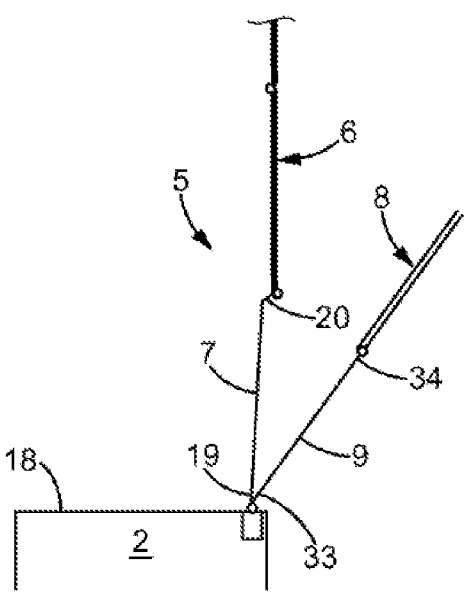

In the folded position, the first arm 7 is against, or at least directly facing and substantially parallel to, the support face 16. Then, successively on the first arm 7, are the second arm 9, the second device 8, then the stacked sections 6.1, 6.2 and 6.3 (FIG. 21a). The first arm 7 and the sections 6.1, 6.2, 6.3 of the first device 6 are deployed, raising the second arm 9 and the second device 8 (FIG. 21b). When the first arm 7 is in the deployed position (FIG. 21c), the second arm 9 is then against the first arm 7, and the second device 8 cannot be deployed without impeding the first device 6 (FIG. 21d). The second arm 9 is then at a distance from the first arm, for example due to its flexibility, and the second device 9 can be deployed in the position of use (FIG. 21e).

Figure 22A:
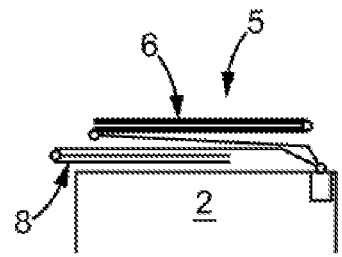
FIGS. 22a to 22d are perspective diagrammatic representations showing the deployment kinematics of the arms according to a variant.
Figure 22B:
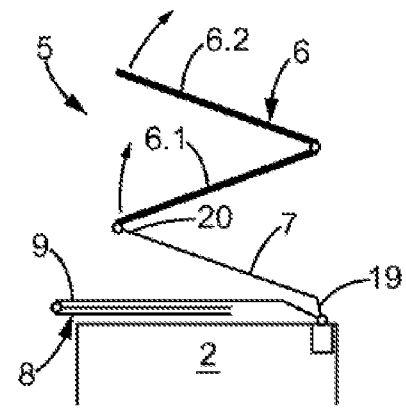
Figure 22C:
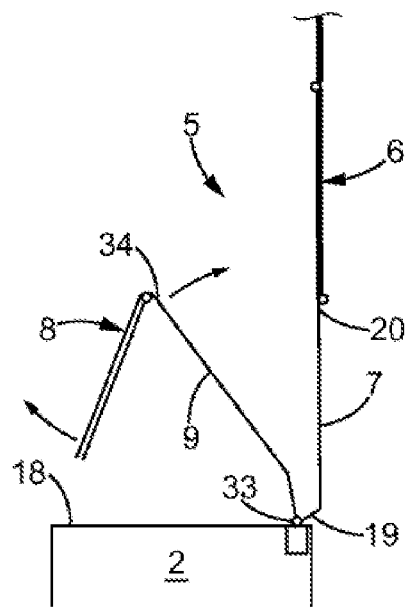
Figure 22D:
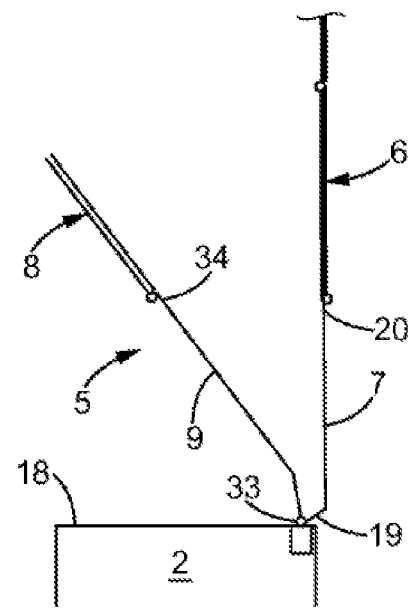

A possible variant is shown in FIGS. 22a to 22d, in which the first device 6 comprises two sections 6.1 and 6.2. In the folded position, the second device 8 is against, or at least directly facing and substantially parallel to, the support face 16. The second arm 9 is folded on the second device 8. The first arm 7 is stacked on the second arm 9, and the sections 6.1 and 6.2 of the first device 6 are folded stacked on the first arm 7 (FIG. 22a). The first arm 7 is then deployed with the sections 6.1 and 6.2 of the first device 6, the second arm 9 remaining in the folded position (FIG. 22b). Once the first arm 7 is brought completely into the deployed position, deployment of the second arm 9 and the second device 8 is initiated (FIG. 22c), until the second arm 9 is brought into the deployed position and the second device 8 is also deployed in the operating position.

The radiator 25 mounted on the pair 5 of supporting arms as described above, for both embodiments, can utilize any type of means in order to ensure heat transfer from the equipment of the satellite to the radiative faces 26 of the radiator 25. For example, the means can comprise the circulation of a coolant fluid in flexible channels or also flexible channels forming loops, known as "loop heat pipes". Also, the means for ensuring the heat transfer can include mechanical pumps or also heat pumps.

In the two embodiments described above, when the radiative faces 26 of the radiator 25 are perpendicular to the front face 24 of the solar panel 23, a temperature gradient occurs in the radiator 25.

Figure 23A:
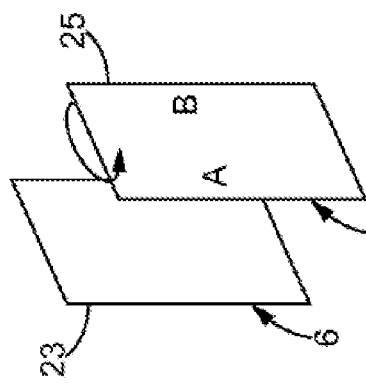
FIGS. 23a to 23d are diagrammatic representations of a radiator mounted on a supporting arm in four different positions relative to a solar panel.

For example, according to the first embodiment and the first mode of operation, in which the radiator is aligned with the axis Z of the satellite 1, at the position marked 00:00, the radiative faces 26 are substantially parallel to the solar panel 23, so that the whole of the radiative face 26 facing the solar panel 23 is substantially at the same temperature (FIG. 23a).

Figure 23B:
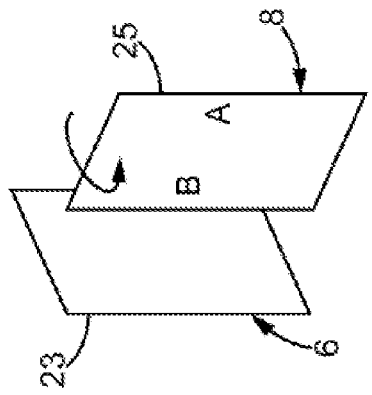
Figure 23C:
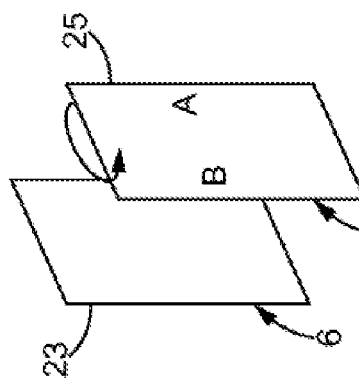

At the position marked 06:00, the operational axis O being parallel to the axis X of the satellite 1, the radiator 25 has one side, denoted B, closer to the solar panel 23 than the other side, denoted A, sides A and B being defined along the axis X in this example. Side B is therefore at a temperature greater than that of side A, and a temperature gradient occurs (FIG. 23b).

At the position marked 12:00, the operational axis O is again parallel to the axis Z, and there is no temperature gradient in the radiator.

Figure 23D:
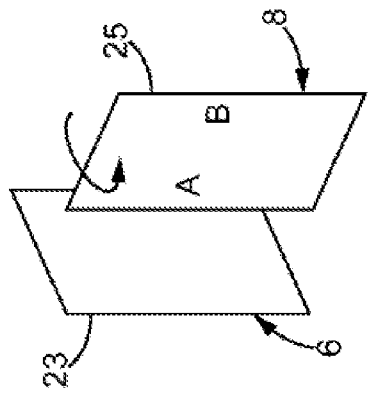

At the position marked 18:00, a configuration similar to that at the position marked 06:00 is produced, except that side A is closer to the solar panel than side B, again causing a temperature gradient to occur in the radiator 25 (FIG. 23d), but in the opposite direction to that at the position marked 06:00.

The occurrence of the thermal gradient in the radiator 25 is highly undesirable. In fact, for example, when the coolant fluid circulating in the radiator 25 enters by side B, at the position marked 06:00, the fluid will leave again from side A colder than at the position marked 18:00. Thus, the efficiency of the radiator 25 to dissipate heat varies during the movement of the satellite 1 in orbit.

Figure 25:
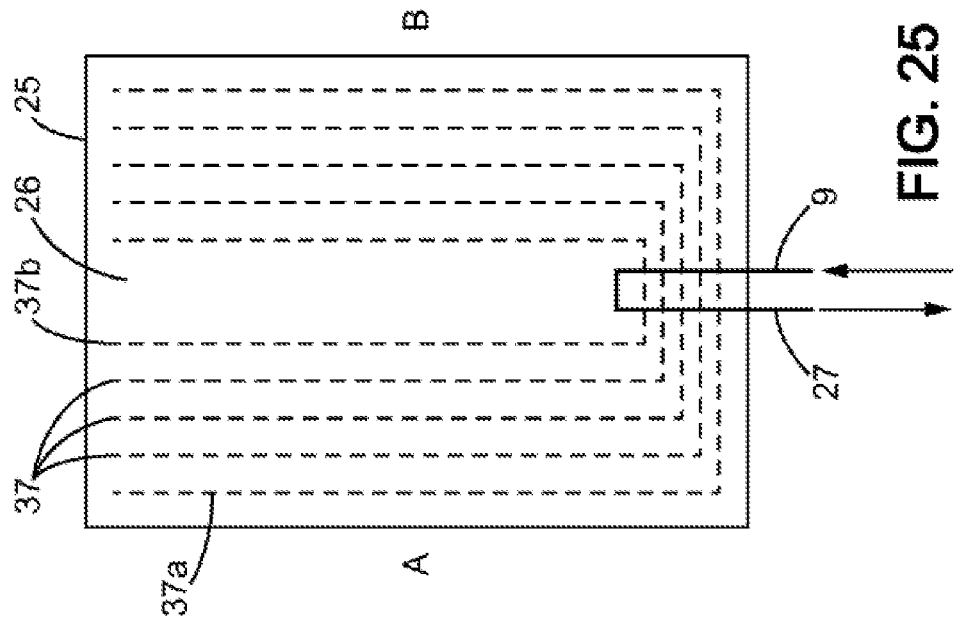
FIG. 25 is a front view of a radiator according to a second embodiment.
Figure 24:
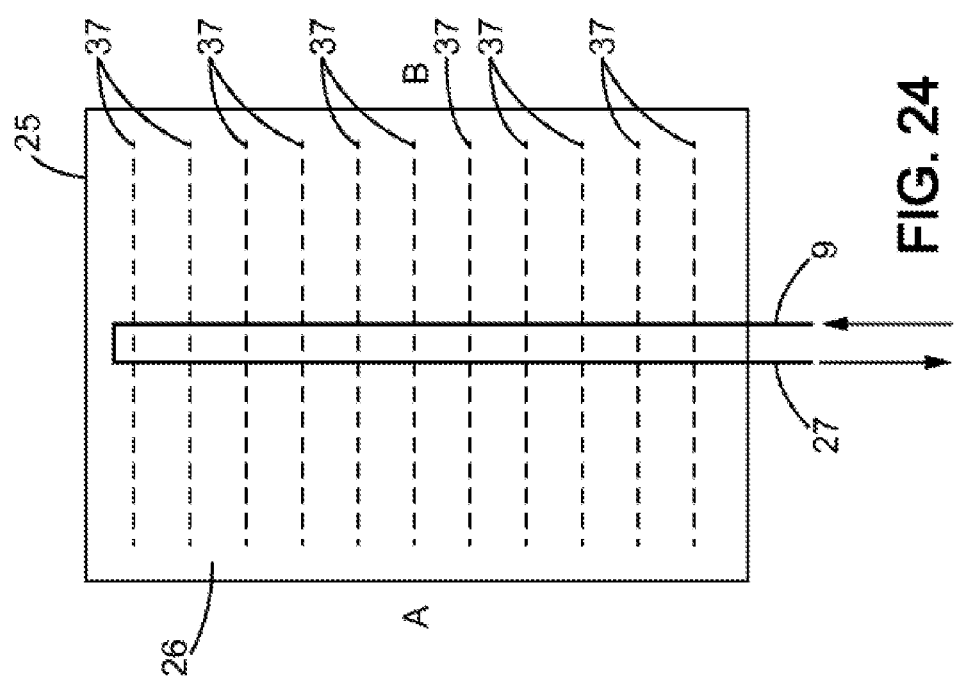
FIG. 24 is a front view of a radiator according to a first embodiment.

In order to remedy this problem, the radiator 25 comprises at least one, and preferably a plurality of heat pipes 37, distributed over its radiative faces 26, which distribute the heat throughout the radiator 25. The heat pipes 37 are represented in broken lines in FIGS. 24 and 25. The temperature is thus homogenized over the whole of each radiative face 26.

According to a first embodiment, the heat pipes 37 are distributed in lines parallel to each other, in the direction of the width of the radiator 25, so as to go from side A to side B. The heat pipes 37 are in contact with the means 27 of fluid connection between the body 2 and the radiator 25 in order to ensure heat transfer.

According to a second embodiment, each heat pipe 37 is U-shaped. More specifically, a heat pipe 37 comprises two vertical branches in the direction of the height of the radiator 25, and one horizontal central branch, in the direction of the width of the radiator 25, connecting the two vertical branches. The horizontal branch is in contact with the means 27 of fluid connection between the body 2 and the radiator 25 in order to ensure heat transfer. A first heat pipe 37a has dimensions greater than those of the other heat pipes 37, i.e. the distance between its vertical branches is greater than that of the other heat pipes. Symmetrically, a last heat pipe 37b has dimensions less than those of the other heat pipes 37, i.e. the distance between its vertical branches is less than that of the other heat pipes. The first heat pipe 37a extends substantially across the radiator, from side A to side B, the last heat pipe 37b remaining in a central zone of the radiator 25. A plurality of other U-shaped heat pipes of intermediate dimensions are placed between the first heat pipe 37a and the last heat pipe 37b.

As the satellite 1 thus comprises a pair 5, preferably two pairs 5a, 5b, of supporting arms, the spatial requirement on the faces of the body 2 is reduced, facilitating the design and installation of the equipment. Moreover, the equipment of the satellite can be of a conventional design, i.e. there is no need to develop new designs for equipment. By using existing equipment, the manufacturing costs of the satellite 1 are reduced.

Moreover, in particular in the case where the second devices 8 are radiators 25, the thermal performances are enhanced without significantly increasing the manufacturing costs of the satellite 1. Moreover, the performances are stable throughout the period of operation of the satellite 1.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A space craft capable of being put into orbit around a planet, comprising a body, at least one pair of supporting arms, a first device mounted on a first supporting arm and a second device mounted on a second supporting arm, said first arm being rotatably mounted on said body about an axis of rotation, said second arm being fixed to said body, and at least one of said first device and second device is offset with respect to said axis of rotation of said first arm, wherein said pair of supporting arms comprises a hollow mounting module for rotatably mounting said first arm on said body, said mounting module comprising an opening through which said axis of rotation and said second supporting arm pass and comprising means for controlling a sun-synchronous rotation of said first arm about said axis of rotation, said first device being capable of being interposed between the sun and said second device throughout the orbit of the craft, so that said second device is at least partially in a shadow of said first device throughout the orbit of the craft.

2. The craft according to claim 1, wherein said first device comprises a solar panel having a front face capable of receiving rays of the sun turned away from said second device (8) and which is provided with solar cells, said mounting module being annular and comprising an electrical connection with said body.

3. The craft according to claim 1, wherein said first device comprises a blocking panel blocking rays of the sun, said blocking panel being coated with a layer of a material blocking rays of the sun.

4. The craft according claim 1, wherein said second device comprises a radiator, said second arm being equipped with means for establishing a heat transfer between said radiator and equipment of the craft.

5. The craft according to claim 4, wherein the means for establishing a heat transfer between said radiator and said body comprises a fluid connection for the circulation of a coolant fluid.

6. The craft according to claim 4, wherein said radiator is in the form of a panel with two opposite radiative faces and comprises a plurality of heat pipes distributed over said radiative faces.

7. The craft according to claim 1, wherein said second device comprises an antenna, said first device being transparent to waves with wavelengths corresponding to one of emission and reception wavelengths of said antenna.

8. The craft according to claim 1, wherein said second device comprises a nozzle for a motor or a plasma thruster.

9. The craft according to claim 1, wherein said second arm comprises at least one portion flexible about any direction perpendicular to said axis of rotation of said first arm, said first device being aligned on said axis of rotation.

10. The craft according to claim 1, wherein said second arm is rigid, said second device being aligned on said axis of rotation.

11. The craft according to claim 1, wherein said body has at least one support face, and said first arm and second arm are rotatably articulated with respect to said body about an axis of articulation perpendicular to said axis of rotation of said first arm, each arm being able to assume two extreme positions with respect to said support face:
  a deployed position, in which the arm considered projects from said support face,
  a stowed position, in which the arm considered is brought substantially parallel to said support face.

12. The craft according to claim 11, wherein said two arms in said stowed position are superimposed on one another.

13. The craft according to claim 11, wherein said second arm can assume an intermediate position in which said second arm forms a predetermined angle with said support face.

14. The craft according to claim 1, comprising two pairs of supporting arms, a first arm of each of said pairs being rotatably mounted on said body about said axis of rotation, a first pair of supporting arms being mourned on a first support face of said body and a second pair of supporting arms being mounted on a second support face of said body, said first support face and said second support face being opposite to one another along said axis of rotation of said first arm.

15. A method for the utilization of a craft around a planet, said craft comprising, a body, at least one pair of supporting arms, a first device mounted on a first supporting arm and a second device mounted on a second supporting arm, said first arm being rotatably mounted on said body about an axis of rotation, said second arm being fixed to said body, and at least one of said first device and second device is offset with respect to said axis of rotation of said first arm, wherein said pair of supporting arms comprises a hollow mounting module for rotatably mounting said first arm on said body, said mounting module comprising an opening through which said axis of rotation and said second supporting arm pass and comprising means for controlling a sun-synchronous rotation of said first arm about said axis of rotation, said first device being capable of being interposed between the sun and said second device throughout the orbit of the craft, so that said second device is at least partially in a shadow of said first device throughout the orbit of the craft the method comprising the following operations:
  putting said craft into geostationary orbit around the planet;
  putting said first device into an initial position in relation to said second device in which said first device receives rays of the sun, said second device being at least partially in a shadow of said first device;
  utilizing means for controlling a sun-synchronous rotation of said first arm, said second device remaining in said shadow of said first device throughout the orbit around the planet.

\* \* \* \* \*